United States Patent
Higgins et al.

(10) Patent No.: US 9,898,742 B2
(45) Date of Patent: Feb. 20, 2018

(54) VIRTUAL DRESSING ROOM

(71) Applicants: Krystal Rose Higgins, Sunnyvale, CA (US); Eric J. Farraro, San Jose, CA (US); John Tapley, Santa Clara, CA (US); Kumaresan Manickavelu, Port Blair (IN); Saurav Mukherjee, West Bengal (IN)

(72) Inventors: Krystal Rose Higgins, Sunnyvale, CA (US); Eric J. Farraro, San Jose, CA (US); John Tapley, Santa Clara, CA (US); Kumaresan Manickavelu, Port Blair (IN); Saurav Mukherjee, West Bengal (IN)

(73) Assignee: eBay Inc., San Jose, CA (US)

( * ) Notice: Subject to any disclaimer, the term of this patent is extended or adjusted under 35 U.S.C. 154(b) by 322 days.

(21) Appl. No.: 13/679,498

(22) Filed: Nov. 16, 2012

(65) Prior Publication Data
US 2014/0035913 A1    Feb. 6, 2014

Related U.S. Application Data

(60) Provisional application No. 61/679,630, filed on Aug. 3, 2012.

(51) Int. Cl.
*G06Q 30/00* (2012.01)
*G06T 17/00* (2006.01)
(Continued)

(52) U.S. Cl.
CPC ......... *G06Q 30/00* (2013.01); *G06Q 30/0641* (2013.01); *G06T 17/00* (2013.01); *G06T 19/00* (2013.01); *G06T 2210/16* (2013.01)

(58) Field of Classification Search
None
See application file for complete search history.

(56) References Cited

U.S. PATENT DOCUMENTS 5,930,769 A    7/1999   Rose
6,546,309 B1   4/2003   Gazzuolo
(Continued)

OTHER PUBLICATIONS

Julian Horsey, "Augmented Reality App Allows You to Try Clothes Before You Buy in a Virtual Dressing Room (video)", published on Geeky-gadgets.com at http://www.geeky-gadgets.com/augmented-reality-app-allows-you-to-try-clothes-before-you-buy-in-a-virtual-dressing-room-29-09-2010/, Publication Date Sep. 29, 2010.*
(Continued)

*Primary Examiner* — Sarah Le
(74) *Attorney, Agent, or Firm* — Schwegman Lundberg & Woessner, P.A.

(57) ABSTRACT

A method and system are provided to facilitate recognition of gestures representing commands to initiate actions within an electronic marketplace on behalf of a user. Spatial data about an environment external to a depth sensor may be received by an action machine. The action machine may generate a first model of a body of the user based on a first set of spatial data received at a first time. The action machine may then generate a second model of the body of the user based on a second set of spatial data received at a second time. The action machine may further determine that a detected difference between the first and second models corresponds to a gesture by the user, and that this gesture represents a command by the user to initiate an action within the electronic marketplace on behalf of the user.

18 Claims, 35 Drawing Sheets

(51) Int. Cl.
*G06T 19/00* (2011.01)
*G06Q 30/06* (2012.01)

(56) References Cited

U.S. PATENT DOCUMENTS

| | | | |
|---|---|---|---|
| 8,401,914 B1 | 3/2013 | Kim | |
| 8,700,392 B1* | 4/2014 | Hart et al. | 704/231 |
| 2005/0275638 A1* | 12/2005 | Kolmykov-Zotov et al. | 345/179 |
| 2008/0004116 A1* | 1/2008 | Van Luchene et al. | 463/42 |
| 2009/0115777 A1 | 5/2009 | Reyers Moreno | |
| 2010/0034462 A1* | 2/2010 | Nevatia et al. | 382/190 |
| 2010/0217685 A1* | 8/2010 | Melcher | G06F 3/04883 705/26.1 |
| 2011/0246329 A1* | 10/2011 | Geisner | G06F 3/017 705/27.1 |
| 2012/0022978 A1 | 1/2012 | Manea et al. | |
| 2012/0137259 A1* | 5/2012 | Campbell | G06F 3/0304 715/863 |
| 2012/0239513 A1* | 9/2012 | Oliver | G06Q 30/0643 705/14.73 |
| 2012/0257035 A1* | 10/2012 | Larsen | 348/78 |
| 2012/0299912 A1 | 11/2012 | Kapur et al. | |
| 2013/0185679 A1 | 7/2013 | Fretwell et al. | |
| 2013/0215116 A1 | 8/2013 | Siddique et al. | |
| 2013/0254066 A1* | 9/2013 | Amacker | G06Q 30/06 705/26.8 |
| 2014/0180873 A1 | 6/2014 | Rijhwani | |
| 2016/0063588 A1 | 3/2016 | Gadre et al. | |

OTHER PUBLICATIONS

"3D Scanning Services—Konica Minolta 3D Scanning Labs", [Online]. Retrieved from the Internet: <URL: http://sensing.konicaminolta.us/search-by-services/3d-scanning-services/>, (Accessed Feb. 15, 2013), 2 pgs.

"A Brief Overview of Gesture Recognition", This page is maintained by Charles Cohen and sponsored by Cybernet Systems Corporation,, [Online]. Retrieved from the Internet: <URL: http://homepages.inf.ed.ac.uk/rbf/CVonline/LOCAL_COPIES/COHEN/gesture_o>, (Accessed Feb. 14, 2013), 17 pgs.

"Gesture Design Blog: Gestural Intent", [Online]. Retrieved from the Internet: <URL: http://gesturedesignblog.com/?page_id=63>, (Mar. 15, 2010), 4 pgs.

"Gesture recognition—Wikipedia, the free encyclopedia", [Online]. Retrieved from the Internet: <URL: http://en.wikipedia.org/wiki/Gesture_recognition>, (Accessed Feb. 15, 2013), 6 pgs.

"Gesture Technology—Virtual Dressing rooms!! Punitatanna's Blog", [Online]. Retrieved from the Internet: <URL: http://punitatanna.wordpress.com/2010/08/31/gesture-technology-virtual-dressing-rooms/>, (Aug. 31, 2010), 5 pgs.

"Gestures control true 3D display", [Online]. Retrieved from the Internet: <URL: Info collage around internet: Gestures control true 3D display>, (Dec. 29, 2004), 2 pgs.

"GestureTek", GestureTeck Inc. is Purchased Back by Co-Founder Vincent John Vincent, [Online]. Retrieved from the Internet: <URL: http://www.gesturetek.com/>, (Accessed Feb. 15, 2013), 1 pg.

"HowStuffWorks: Electronics", [Online]. Retrieved from the Internet: <URL: http://electronics.howstuffworks.com/>, (Accessed Feb. 14, 2013), 2 pgs.

"Kinect—Wikipedia, the free encyclopedia", (Accessed Feb. 15, 2013), 16 pgs.

"Kinect Body Scanning—Body Scanning Reinvented", [Online]. Retrieved from the Internet: <URL: http://www.styku.com/business/benefits/bodyscanning/>, (Accessed Feb. 15, 2013), 2 pgs.

"kinect_calibration/technical—ROS Wiki", [Online]. Retrieved from the Internet: <URL: http://www.ros.org/wiki/kinect_calibration/technical>, (Accessed Feb. 15, 2013), 8 pgs.

"Metail: translating cutting edge research into commercial success", [Online]. Retrieved from the Internet: <URL: http://www.eng.cam.ac.uk/news/stories/2012/Me_tail/>, (Mar. 15, 2012), 5 pgs.

"My Style Rules—The way you were meant to dress", [Online]. Retrieved from the Internet: <URL: http://mystylerules.com/>, (Accessed Feb. 15, 2013), 1 pg.

"SketchUp—How to Information | eHow.com", [Online]. Retrieved from the Internet: <URL: http://www.ehow.com/sketchup/>, (Accessed Feb. 15, 2013), 27 pgs.

"Skyrim Kinect—YouTube", [Online]. Retrieved from the Internet: <URL: http://www.youtube.com/watch?v=Z83wzJwrBK0>, (Accessed Feb. 14, 2012), 2 pgs.

"Top 10 Best Kinect Hacks", [Online]. Retrieved from the Internet: <URL: http://www.kinecthacks.com/top-10-best-kinect-hacks>, (Accessed Feb. 15, 2013), 6 pgs.

"Virtual Dressing Room", Wikipedia, the free encyclopedia, [Online]. Retrieved from the Internet: <URL: http://en.wikipedia.org/wiki/Virtual_dressing_room>, (Accessed Feb. 14, 2013), 4 pgs.

Baudel, Thomas, et al., "CHARADE: Remote Control of Objects using Free-Hand Gestures", [Online]. Retrieved from the Internet: <URL: http://thomas.baudel.name/Morphologie/cacm.html>, (Accessed Feb. 15, 2013), 9 pgs.

Billinghurst, Mark, et al., "Chapter 14: Gesture Based Interaction", [Online]. Retrieved from the Internet: <URL: http://www.billbuxton.com/input14.Gesture.pdf>, (Aug. 24, 2011), 35 pgs.

Cordier, Frederic, et al., "Made-to-Measure Technologies for Online Clothing Store", [Online]. Retrieved from the Internet: <URL: http://www.miralab.ch/repository/papers/25.pdf>, (Accessed Feb. 15, 2013), 12 pgs.

Crawford, Stephanie, "HowStuffWorks: How Microsoft Kinect Works", [Online]. Retrieved from the Internet: <URL: http://electronics.howstuffworks.com/microsoft-kinect.htm>, (Accessed Feb. 14, 2013), 2 pgs.

Daly, Erica, "This is the Year of the Virtual Fit Assistant | Techli", [Online]. Retrieved from the Internet: <URL: http://techli.com/2011/11/year-of-virtual-fit-assistant/>, (Nov. 16, 2011), 3 pgs.

Hunter, Seth, et al., "WordPlay: A Table-Top Interface for Collaborative Branstorming and Decision Making", Proceedings of IEEE Tabletops and Interactive Surfaces, 2008, [Online]. Retrieved from the Internet: <URL: http://fluid.media.mit.edu/sites/default/files/WordPlayFinalIEEE_AffiliationIncluded.pdf>, (2008), 4 pgs.

Kimbrel, Heather, "How to Create a Virtual Model of My Body Measurements | eHow.com", [Online]. Retrieved from the Internet: <URL: http://www.ehow.com/how_6817795_create-virtual-model-body-measurements.html>, (Accessed Feb. 15, 2013), 3 pgs.

Li, Rong, et al., "Research of Interactive 3D Virtual Fitting Room on Web Environment", ISCID Proceedings of the 2011 Fourth International Symposium on Computational Intelligence and Design—vol. 01, [Online]. Retrieved from the Internet: <URL: http://ieeexplore.ieee.org/xpl/articleDetails.jsp?reload=true&arnumber=6079627&contentType=Conference+Publications>, (2011), 32-35.

MacCormick, John, "How does the Kinect work?", [Online]. Retrieved from the Internet: <URL: http://users.dickinson.edu/~jmac/selected-talks/kinect.pdf>, (Accessed Feb. 15, 2013), 52 pgs.

Newitz, Annalee, "10 physical gestures that have been patented", (Jun. 6, 2011), 5 pgs.

Nickinson, Phil, "Front-facing cameras mean hand-free gesture commands for Android", [Online]. Retrieved from the Internet: <URL: http://www.androidcentral.com/front-facing-cameras-mean-hands-free-gesture-co . . . >, (Accessed Feb. 14, 2013), 6 pgs.

Saldanha, Carlos, et al., "System and Method for Displaying Selected Garments on a Computer-Simulated Mannequin", [Online]. Retrieved from the Internet: <URL: http://www.faqs.org/patents/app/20100302275>, (Dec. 2, 2010), 10 pgs.

Slawski, Bill, "Would You Give a Search Engine a 3D Model of Your Body?—SEO by the Sea", [Online]. Retrieved from the Internet: <URL: http://www.seobythesea.com/2009/01/would-you-give-a-search-engine-a-3d-model-of-your-body/>, (Jan. 16, 2009), 11 pgs.

Sterling, Bruce, "Beyond the Beyond—Augmented Reality: Kinect fitting-room for TopShop, Moscow", [Online]. Retrieved from the Internet: <URL: http://www.wired.com/beyond_the_beyond/2011/05/augmented-reality-kinect-fitting-room-for-topshop-moscow/>, (May 10, 2011), 2 pgs.

(56) References Cited

OTHER PUBLICATIONS

Stevens, Tim, "Apple patent application opens the door to free-form acoustic gesture commands", [Online]. Retrieved from the Internet: <URL: http://www.engadget.com/2011/02/21/apple-patent-application-opens-the-door-to . . . >, (Feb. 21, 2011), 3 pgs.

Woolley, Richard, "Gesture Commands Performed in Proximity but Without Make Physical Contact with a Touchpad", [Online]. Retrieved from the Internet: <URL: http://www.faqs.org/patents/app/20090167719>, (Jul. 2, 2009), 4 pgs.

"Get Your Converse Shoes on Virtually Using Augmented Reality", © 2012 DigitalAnalog—An Online Publication for Creativity + Code., [Online]. Retrieved from the Internet: <URL: http://digitalanalog.in/2011/03/14/get-your-converse-shoes-on-virtually-using-augmented-reality/>, (Mar. 14, 2011), 7 pgs.

"The Future of Shopping is Here", Copyright © 2012 Simply Zesty, [Online]. Retrieved from the Internet: <URL: http://www.simplyzesty.com/advertising-and-marketing/the-future-of-shopping-is-here-video/>, (Jun. 12, 2012), 9 pgs.

"Trying on Shoes Made Easy at the Adidas Shop in Paris", © 2012 Sugar Inc. Insanely Addictive™, [Online]. Retrieved from the Internet: <URL: http://www.geeksugar.com/Trying-Shoes-Made-Easy-Adidas-Shop-Paris-159420>, (Mar. 6, 2007), 5 pgs.

"U.S. Appl. No. 13/725,209, Final Office Action dated May 8, 2014", 7 pgs.

"U.S. Appl. No. 13/725,209, Non Final Office Action dated Jan. 17, 2014", 9 pgs.

"U.S. Appl. No. 13/725,209, Response dated Apr. 17, 2014 to Non Final Office Action dated Jan. 17, 2014", 15 pgs.

Higgins, Krystal, "Designing Kinect-Based Experiences", [Online]. Retrieved from the Internet: <URL: http://www.kryshiggins.com/thoughts-on-designing-kinect-based-experiences/>, (Apr. 4, 2011), 12 pgs.

"U.S. Appl. No. 13/725,209, Final Office Action dated Apr. 8, 2015", 10 pgs.

"U.S. Appl. No. 13/725,209, Non Final Office Action dated Oct. 20, 2014", 8 pgs.

"U.S. Appl. No. 13/725,209, Response dated Mar. 20, 2015 to Non Final Office Action dated Oct. 20, 2015", 23 pgs.

"U.S. Appl. No. 13/725,209, Response dated Sep. 8, 2014 to Final Office Action dated May 8, 2014", 10 pgs.

"U.S. Appl. No. 13/725,209, Response dated Jul. 8, 2015 to Final Office Action dated Apr. 18, 2015", 19 pgs.

"U.S. Appl. No. 13/725,209, Non Final Office Action dated Oct. 6, 2015", 12 pgs.

"U.S. Appl. No. 13/725,209, Final Office Action dated Feb. 26, 2016", 12 pgs.

"U.S. Appl. No. 13/725,209, Response dated Jan. 6, 2016 to Non Final Office Action dated Oct. 6, 2015", 17 pgs.

Rosenfeld, Azriel, "Picture Processing by Computer", Academic Press, (1969), 28 pgs.

"U.S. Appl. No. 13/725,209, Non Final Office Action dated Sep. 9, 2016", 11 pgs.

"U.S. Appl. No. 13/725,209, Response dated May 26, 2016 to Final Office Action dated Feb. 26, 2016", 10 pgs.

"U.S. Appl. No. 14/472,125, Non Final Office Action dated May 31, 2017", 17 pgs.

\* cited by examiner

Initial welcome state. "Pretend" to load outfits in the user's size.
1.1 Info plane rotates back and forth while loading.
1.2 Loading ring on ground plane.
1.3 Navigation button to "My Closet" (implied, but not implemented)
1.4 Share button (in our case, "Fashion Show")

Finish loading outfits on the virtual rack. One automatically appears on the user.
3.1 Buy (contextual to item/outfit selected)
3.2 Price (contextual to item/outfit selected)
3.3 "Add to closet" (contextual to item/outfit selected)
3.4 Selected item, which is highlighted Finish loading shirts on the rack. This view shows that we are focused on the individual item versus the outfit.
12.1 Color picker is now a contextual control (could also be pattern selector, etc).

Color picker expands open. Use hand/palm to scrub it.
14.1 Circle highlights the current selection on color picker
14.2 Optional: Selection on color picker changes the color of all shirts on the rack, to show off the potential for search by color/pattern.

Fashion show with Catwalk.
17.1 Back to prior view (outfit picker)
17.2 Take a snapshot. Or, could we just say, "Cheese!" to activate camera?

VIRTUAL DRESSING ROOM

RELATED APPLICATION

This application claims the priority benefit of U.S. Provisional Patent Application No. 61/679,630, filed Aug. 3, 2012, which is incorporated herein by reference in its entirety.

TECHNICAL FIELD

The subject matter disclosed herein generally relates to the processing of data. Specifically, the present disclosure addresses systems and methods to facilitate provision of a virtual dressing room.

BACKGROUND

A number of e-commerce sites exist on the Internet. An electronic marketplace, such as eBay.com, is an example of such an e-commerce site. Many of these e-commerce sites facilitate commercial transactions between users of these sites. Some users may list items for sale on such e-commerce sites, while other users may buy or make bids for the items listed for sale.

BRIEF DESCRIPTION OF THE DRAWINGS

Some embodiments are illustrated by way of example and not limitation in the figures of the accompanying drawings.

DETAILED DESCRIPTION

Figure 1:
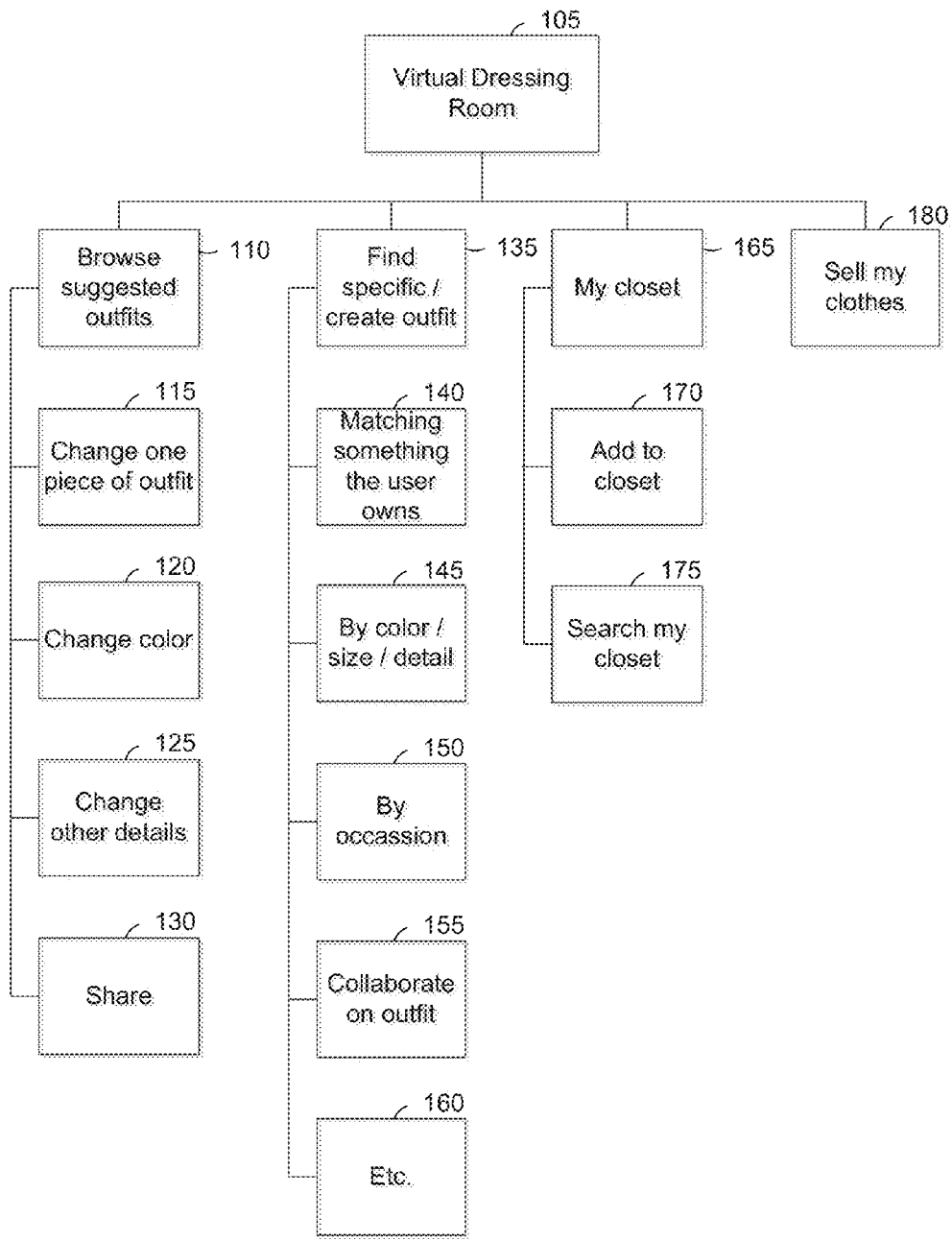
FIG. 1 is a chart illustrating examples of possible actions in a virtual dressing room, according to some example embodiments.

Example methods and systems are directed to facilitating provision of a virtual dressing room. Provision of a virtual dressing room may include recognition of one or more gestures representing commands to take actions, as well as initiating one or more actions on behalf of a user, within an electronic marketplace. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some people shop online because on-line shopping may save them time or increase their shopping options. Others want to avoid the hassle of going to the mall, while other shoppers would rather shop "on the go" (e.g., using mobile devices). However, what many online clothing shoppers have in common is their desire to try on the clothing they see online before they choose to buy an item. The subject matter described herein may allow a user of a system, using a gesture, to issue a command to the system to engage in (e.g., to initiate) an action on an electronic marketplace such as eBay, Inc., on behalf of the user.

One example of such action is the system displaying (e.g., on a TV screen, computer screen, or a mobile device screen) a representation of a clothing item (hereinafter, also "virtual clothing" or "item of virtual clothing") mapped to a representation of the user, thus allowing the user to virtually try on the virtual clothing item in a virtual dressing room. The user may also virtually try on a virtual item that relates to clothing, such as footwear or accessories (hereinafter, also "clothing") in the virtual dressing room. In some example embodiments, the virtual clothing that the user may virtually try on is representative of real clothing available for purchase using an electronic marketplace. The user may virtually try on the virtual clothing item while the user is in his home (e.g., using the TV in his living room) or away from home (e.g., using his mobile phone). Another example of an action on an electronic marketplace is the system initiating a purchase order using the electronic marketplace, on behalf of the user, in response to receiving a gesture from the user, the gesture representing a command to buy an item.

With the use of skeletal and depth tracking technology, for example implemented in depth sensors (e.g., the Microsoft™ Kinect™, hereinafter, "Kinect", stereo cameras, mobile devices, and any other device that may capture depth data) spatial data can be gathered (e.g., by a machine of the system) about objects located in the physical environment external to the depth sensor (e.g., the user's living room). For example, an infrared (hereinafter, also "IR") emitter of the system, located in the user's living room, may project (e.g., emit or spray out) beams of infrared light into surrounding space. The projected beams of IR light may hit and reflect off objects that are located in their path (e.g., the user or a physical object in the user's living room). A depth sensor (e.g., located in the user's living room) may capture (e.g., receive) spatial data about the surroundings of the depth sensor based on the reflected beams of IR light. In some example embodiments, the captured spatial data may be used to create (e.g., represent, model, or define) a 3D field of view that may be displayed on a screen (e.g., of a TV set, computer, or mobile device). Examples of such spatial data include the location and shape of the objects within the room where the spatial sensor is located. In some example embodiments, based on measuring how long it takes the beams of IR light to reflect off objects they encounter in their path and be captured by the depth sensor, the system may determine the location (e.g., the distance from the depth sensor) of the objects off which the beams of IR light reflected (e.g., the user, a furniture piece, or a wall). In various example embodiments, based on the received spatial data, the system may determine details of the objects in the room, such as spatial measurements of the objects in the room (e.g., of the user's body or of the furniture in the room). In some example embodiments, based on the received spatial data, the system may determine gestures made by the user. Some devices (e.g., that may include a depth sensor and a camera) may detect other details of the objects in the room (e.g., texture, color, or pattern of the clothing worn by the user or of a wall of the room).

In various example embodiments, the system may generate a first model based on a first set of spatial data received at a first time. The first model may be representative of a user of an electronic marketplace, at the first time. The system may also generate a second model based on a second set of spatial data received at a second time, and the second model may also be representative of the same user, but at the second time. Then, the system may detect a difference between the first model and the second model. The system may also determine that the difference between the first and second models corresponds to a gesture performed by the user between the first and the second times, and that the gesture represents a command to initiate an action within the electronic marketplace on behalf of the user. In some example embodiments, the system may prompt the user to confirm that the gesture represents the command (e.g., the user intended to issue the command when making the gesture). Based on the user confirming that the gesture represents the command, the system may initiate the action within the electronic marketplace on behalf of the user. Examples of such actions that correspond to user gestures include displaying a representation of a clothing item mapped to a representation of the user, initiating a purchase order of an instance of the clothing item whose representation has been mapped to the representation of the user, listing an item for sale on the electronic marketplace, bidding for an item available for purchase on the electronic marketplace, and generating a representation of a physical object displayed by the user to the depth sensor. Examples of the user confirming that the gesture was intended as a command to initiate an action include repeating the gesture, making a different gesture, and issuing a voice command.

In various example embodiments, the user may engage with the system using gestures when the user is located in the space external to the depth sensor (e.g., in a user's room where the depth sensor is located). In some example embodiments, the user may engage with the system when the user is away from home (e.g., using a mobile device). In certain example embodiments, a mobile device may be used as a depth sensor. In such example embodiments, a camera of a mobile device (e.g., an iPhone or Android phone) may be used to capture an image of the user and to show the captured image of the user on a TV screen. The mobile device may be mounted on a TV set and may be in communication with the TV set to transmit the captured image of the user from the mobile device to the TV set. Thus, the captured image of the user may be communicated to the TV screen and displayed thereon. In other words, the TV screen may act as a mirror for the user. The system may then superimpose a representation of a clothing item onto the image of the user and show the representation superimposed on the image on the TV screen. Using one or more gestures, the user may browse through a number of virtual clothing items or virtual outfits (e.g., a representation of a set of garments and accessories that may be worn together) that the system may suggest (e.g., by displaying them on the TV screen) or that may be found in an electronic marketplace catalogue. Furthermore, the user may also employ a gesture or voice command to save a reference to an item within a shopping cart or purchase the item using the electronic marketplace.

In some example embodiments, the depth sensor may have an infrared emitter to emit a pattern of IR dots (e.g., spray the room with infrared light) and a camera to capture spatial data (e.g., an IR image) containing data about the size, brightness, and distortion of the dots as viewed in space. The captured spatial data may be descriptive of (e.g., include or comprise data about) the shape of the user's body, measurements of the user's body, the user's gestures, space around the user, including other people or objects in the user's vicinity or physical environment. Using the captured spatial data, the system may generate a model of an object located in the physical environment of the spatial sensor. Examples of an object include a person, an animal, and an inanimate item. In some example embodiments, the model may illustrate the shape of the object. The model of an object may be a two-dimensional (hereinafter, also "2D") visual representation or a three-dimensional (hereinafter, also "3D") visual representation of the object. In some example embodiments, the model of the user's body may include a skeletal representation of the user's body. In various example embodiments, the model may include data about the position of the user at the time the spatial data used to generate the model was captured. In some example embodiments, the model of the object may have additional data that corresponds to the model (e.g., text data and audio data). In various example embodiments, the system may store the model of the object, as well as the data that may pertain to the model (e.g., a dimension, shape, size, texture, color, text, and audio) in a database (e.g., a 3D or 2D asset library). The dimensions of the user's body, determined from the captured spatial data, may be used (e.g., by a machine of the system) to create an avatar (e.g., of the user) that may have a shape that resembles the shape of the user's body. The avatar may be two-dimensional or three-dimensional. Similarly, the dimensions of an inanimate object (e.g., a clothing item), determined from the captured spatial data, may be used (e.g., by a machine of the system) to create a 3D representation of the inanimate object. In some example embodiments, the avatar of the user's body and the 3D representation of the inanimate object may be stored in a database and each may reference other stored data that pertains to it. The storing of representations of the users' bodies and of clothing items may allow the system to reuse them and, thus, avoid spending resources in creating them each time a particular user engages with the system or a representation of a clothing item is to be displayed to the user. Furthermore, in some example embodiments, the system may allow the stored representations to be reused by users to virtually try on different virtual clothing items and to avoid having to create a separate representation each time a virtual clothing item is being tried on.

In some example embodiments, the system may determine the user's body measurements (e.g., height or shoulder width) from the captured spatial data and may generate (e.g., build) an avatar of the user using the knowledge of the user's body measurements. In certain example embodiments, the system may generate the user's avatar dynamically. The avatar may be stored (e.g., by the system or by the user) in a memory of a machine (e.g., the user's mobile device) for reuse by the user. Thus, the user may virtually try on virtual clothing from anywhere without having to stand in front of the depth sensor every time he or she wants to virtually try on virtual clothing. In various example embodiments, the user may use this avatar to engage in mobile clothes shopping (e.g., when not using the depth sensor in his home).

In some example embodiments, as noted above, the avatar is two-dimensional. In other example embodiments, the avatar is a three-dimensional representation of the user's body. In certain example embodiments, the system may generate a 3D representation of a clothing item (e.g., available for purchase using the electronic marketplace), size the representation of the clothing item according to the user's body measurements (e.g., find the size of the clothing item that is closest to the user's body measurements), and display the 3D representation of clothing overlaid on the 3D avatar. The determination of the user's body measurements, the generation of an avatar based on the user's body measurements, and the sizing of the virtual clothing to the user's measurement may, for example, allow the user to better understand how the real clothing item would fit him or her without physically trying on the real clothing item.

In some example embodiments, the electronic marketplace operator may recommend to the user a virtual clothing item or a virtual outfit to virtually try on. In certain example embodiments, the system may determine one or more of the user's body measurements based on the received spatial data. Based on the determined user's body measurements, the system may recommend to the user only virtual clothing items that fit the user's body measurements. Not having to consider virtual clothing items that do not fit may save the user time while shopping on the electronic marketplace. In certain example embodiments, the system provides the user with a choice for changing the size of the virtual recommended item.

In various examples, the system may recommend a clothing item by displaying a representation of the clothing item overlaid on a representation of the user. As noted above, the representation of the item may be two-dimensional or three-dimensional. The representation of the user may also be two-dimensional or three-dimensional. In various examples, the creation of a 3D representation of the user's body or of an item of clothing based on spatial data captured by a depth sensor may be rotated, which may allow the user to view the 3D representation of the user's body or of the clothing item from different perspectives. This may help the user understand better how the fabric of the clothing item would move when the user wearing the clothing item would move. In some example embodiments, the system maps a 3D virtual clothing item onto the user's 3D avatar. In various example embodiments, the 2D virtual clothing is displayed overlaid on a 2D image of the user (e.g., a video feed of the user).

In various example embodiments, the user may employ a particular gesture to change the color, pattern, or texture of a representation of the clothing item the user is virtually trying on. In some example embodiments, the user may use a gesture to communicate a command to the system to create a 3D representation of an item of real clothing the user is wearing. The user may use another gesture to create a listing of the item of real clothing the user is wearing. In various example embodiments, the listing may include the 3D representation of the clothing item the user is wearing as part of the description of the clothing item. In certain example embodiments, the listing describes the clothing item being offered for sale. In some example embodiments, the system may add the listing that describes the clothing item into a catalogue of items. In some example embodiments, the catalogue listings may contain 3D representations of items. In various example embodiments, the user may make a gesture toward an item, and the depth sensor may capture spatial data about the user's gesture and about the item toward which the user gestured. Then, the system may interpret the gesture in relation to the item toward which the user gestured. In certain example embodiments, based on interpreting the gesture (e.g., determining the action that corresponds to the gesture), the system may create a 3D representation of the item. In some example embodiments, the user may make another gesture to command the system to store the 3D representation of the item in a database. In certain example embodiments, the system may receive a record (e.g., an inventory entry or a description) of an item to be used in the creation of a catalogue of items. Such a record may include an image of the item. In some example embodiments, based on one or more rules, the system may remove from the image certain content (e.g., background) and may use the remaining content to generate a representation of the item that may become part of a catalogue of items. In some example embodiments, the representation of the item is a 3D representation of the item generated based on the content of the image received in the record.

In some example embodiments, upon either obtaining spatial data about the user's body for the first time or recognizing the user based on previously received spatial data about the user's body, the system may retrieve, from a database, a recommended virtual clothing item or virtual outfit in the user's size and may display it to the user. In certain example embodiments, the system may present an item of virtual clothing in response to a voice command (e.g., by the user). In some example embodiments, the system may adjust the size of the virtual clothing item to fit the user's body measurements after retrieving the virtual clothing item from the database and before it presents the virtual clothing item to the user. In certain example embodiments, the system may present just one item that relates to clothing.

When the user is in the virtual dressing room (e.g., when the user interacts with the system described herein), in addition to virtually trying on virtual items of clothing, the user may add a virtual outfit to his or her closet, search for a specific item of virtual clothing in the user's virtual closet, search for a real item of clothing on the electronic marketplace, mix and match a recommended virtual clothing item with virtual outfits or single items saved in the user's virtual closet, buy, sell, or bid for a clothing item on the electronic marketplace, or hold a social network virtual fashion show by presenting the virtual outfit on a virtual runway. The system may provide the user the choice to create a virtual closet to store virtual clothing items. In some example embodiments, the user may get feedback from the user's friends over a social network service (e.g., Twitter®, hereinafter also "Twitter", or Facebook®, hereinafter, also "Facebook".) The user's friends may comment on the virtual outfits, give advice, and even coordinate virtual outfits. If they have access to a depth sensor, such as a Kinect, the user's friends may join the user in a group virtual dressing room. In some example embodiments, a group virtual dressing room may be useful as a fitting room for a group of people coordinating outfits for an event, such as a wedding.

In some example embodiments, the system may allow the user to virtually try on virtual clothing while away from the depth sensor (e.g., located in the user's living room) by displaying an avatar of the user's body within the user interface of a mobile device. In certain example embodiments, the avatar is generated based on the user's body measurements derived from spatial data descriptive of the user's body, which spatial data was previously received from the depth sensor. In various example embodiments, the system may use spatial data that may include data about the shape of the user's body in generating the avatar of the user's body. In some example embodiments, the avatar is generated by the system based on data provided by the user (e.g., photographs, sizes, or body measurements).

In some example embodiments, the use of garment recognition technology in the present system may allow for easier and more accurate selling of clothes (e.g., using the electronic marketplace). The system may recognize a particular clothing item based on depth data received from the depth sensor and may create a visual representation of the clothing item. In certain example embodiments, after recognizing the item, the system may retrieve a visual representation of the clothing item from a database (e.g., from an asset library). In some example embodiments, the system may include the visual representation of the item in a listing for sale on an electronic marketplace. In various example embodiments, the visual representation of the item is three-dimensional. In certain example embodiments, the visual representation is two-dimensional.

In some example embodiments, the system may be described to receive a spatial data feed descriptive of the body of the user in a 3D physical space. The spatial data feed may be received from a depth sensor. The system may generate a model of the user based on the spatial data feed descriptive of the body of the user. The model of the user may include positional data descriptive of a movement of a body part of the user. The model of the user may also include a first shape of the user's body based on the spatial data received at a first time and a second shape of the user's body based on the spatial data received at a second time. Then, the system may determine a gesture of the user based on the model of the user. In some example embodiments, the determining of the gesture may be performed by analyzing a difference between the first and second shapes of the model of the user. The system may also determine an action that corresponds to the gesture of the user. In various example embodiments, the system may perform the action that corresponds to the gesture.

In certain example embodiments, the system may be described to receive a stream of spatial data, which stream of spatial data may include a delineation of a contour of the user's body in a three-dimensional physical space. The stream of spatial data may be received from a depth sensor. The system may generate a model of the user based on the received spatial data. The model may include positional data that describes a movement of a body part of the user. The model may also include a first shape of the user's body based on the spatial data received at a first time and a second shape of the user's body based on the spatial data received at a second time. The system may determine a gesture based on the model of the user by analyzing a difference between the first and second shapes of the model of the user. The system may also interpret the gesture as a command to perform an action that corresponds to the gesture. In some example embodiments, the system may perform the action that corresponds to the gesture.

In various example embodiments, the user may engage and interact with the system using gestures. In some example embodiments, the system presents virtual interface buttons which the user may virtually push. An example of the virtually pushing of a virtual button is the user making a pushing motion with a hand toward a virtual button on a screen of the system. In certain example embodiments, the system, using gesture recognition technology, may determine that the user made a motion with a part of the user's body, may interpret that motion to be a gesture, may further determine what gesture the user intended, and may perform the action associated with the particular gesture. In some example embodiments, upon determining which action corresponds to the captured gesture, the system may request the user to perform another gesture or issue a voice command to confirm that the user intended the system to perform the action that corresponds to the gesture. Examples of actions that the user may request the system to perform in response to the user's gestures are virtual entering the virtual dressing room, displaying virtual clothing items, displaying the virtual clothing items on a virtual clothing rack, creating virtual outfits from separate virtual clothing items, shuffling the virtual outfits on the virtual clothing rack, spreading the virtual clothing items on the virtual clothing rack, displaying the price of a real clothing item that corresponds to a selected virtual clothing item, displaying the price of all the real clothing items that correspond to the presented virtual clothing items, buying an instance of a real clothing item that corresponds to a selected virtual clothing item, adding a virtual clothing item to the user's virtual closet, presenting a color picker, texture selector, or pattern selector for the user to have a choice to change the color, texture, or pattern of a presented virtual clothing item, selecting a color, texture, or pattern, invoking a color picker, texture selector, or pattern selector, starting a virtual fashion show, sharing images of virtual clothing displayed with the user on a social network site, requesting comments pertaining to the displayed virtual clothing items from friends on social networks, invoking a camera, and taking a snapshot of a virtual outfit displayed on the virtual catwalk of the virtual fashion show.

Examples of gestures that the user may employ while interacting with the system are taking an initial welcome pose to begin using the system (e.g., virtually enter the virtual dressing room), making a swipe motion to move virtual clothing items on the virtual clothing rack, making a grabbing-and-dragging motion to select a virtual outfit off the rack, virtually pulling on the virtual clothing item to display the virtual clothing item overlaid on the image of the user, jumping to randomize the virtual clothing items presented, showing a thumbs up gesture to communicate "I like this item; show me more like this", showing a thumbs down gesture to communicate "I don't like this; don't show it again", virtually hanging a virtual hanger on a virtual rack to communicate "Put it in my closet", and making a discarding motion to communicate "Next (e.g., show me another item)!" Other examples of gestures that the user may employ while interacting with the system are tapping an item (e.g., a shirt the user is wearing) to select the item, scrubbing an area of the color picker to select a color, moving hands away from each other from an initial almost touching position where only the thumbs and pointing fingers are open to invoke the color picker, virtually pushing a virtual control button to start a virtual fashion show, and pushing a virtual control button to request the display of comments from friends on social networks. In some example embodiments, the user may use voice commands to communicate with the system (e.g., user may say "cheese!" or "shoot!" to activate a camera.)

In some example embodiments, the system using a depth sensor may determine the user's body measurements based on positional data points determined by the system based on the spatial data captured by the depth sensor. The system may pre-filter the clothing items whose representations should be presented to the user such that only representations of clothing items matching the user's body measurements may be presented to the user. For example, if the system determines that the user wears a medium-sized shirt based on the measurements of the user's torso, only representations of shirts of a medium size may be displayed to the user. In certain example embodiments, before a seller lists an item for sale, the seller may display the item within the depth sensor's field of spatial data capture so that the depth sensor may capture the dimensions of that item. The system may determine the size of the item based on the captured dimensions of the item. The captured dimensions and determined size may be provided to a buyer (e.g., by a machine) to help a buyer ascertain the fit of an item. In some example embodiments, the seller may provide 2D images of an item for sale to the system and the system may generate a 3D representation of the item based on the 2D images of the item. In some example embodiments, the system may translate (e.g., correlate) different sizes of items to absolute dimensions. This may assist buyers and sellers in obtaining and delivering more detailed information about the items listed for sale. In various example embodiments, the system may use cloth physics technology to generate a 3D representation of a clothing item that accurately reflects the features of the fabric from which the clothing item was made. For example, clothing items made from different fabrics may hang or move differently based on the type of fabric used to manufacture the particular clothing item. Thus, using cloth physics technology in generating 3D representation of clothing items may allow the user to see how the real physical item of clothing would move when worn by the user.

In certain example embodiments, the system may determine the user's affinity for a type of item (e.g., skirts, dresses, shoes, or jewelry) or characteristic of an item (e.g., color, pattern, or texture) based on tracking the amount of time the user may spend examining a representation of an item displayed to the user. In certain example embodiments, the system may determine that a user has an affinity for an item based on the user viewing a representation of the item more than once. The system may recommend certain items based on the determined affinity of the user for particular items. In various example embodiments, the system may provide curated recommendations to the user (e.g., recommendations by a stylist or another expert). These recommendations may be, for example, style-based.

In certain example embodiments, the depth sensor may be used to perform image recognition. For example, the depth sensor may recognize the items of clothing a person is wearing, as well as the color and texture of those items. The system may present to the user a virtual clothing item that complements another virtual clothing item the user is already virtually trying on. For example, the system may present the user with a representation of a pair of trousers that matches a representation of a shirt the user is virtually trying on. In some example embodiments, the system may extract data about a texture of a clothing item worn by the user and apply that texture to a representation of another clothing item such that the user may visualize the texture on a different clothing item. For example, if the user is wearing a shirt that has a polka dot pattern, the system may extract the respective polka dot pattern from the user's shirt, may apply the polka dot pattern to a representation of a skirt, and may display the representation of the skirt having the polka dot pattern to the user. Thus, the user may be able to visualize how that polka dot pattern would look on the skirt whose representation has been displayed to the user. In certain example embodiments, the system may also have applicability to a home and garden scenario. For example, the system may capture a color from a paint color swatch displayed in the field of vision of a device (e.g., that includes a depth sensor and a camera) and may apply the respective color to a representation of a wall that is displayed to the user on a screen to help him visualize how the wall would look if painted that color.

In various example embodiments, the system may allow the creation of a virtual group dressing room. In some example embodiments, the depth sensor may recognize up to four people in the same field of vision (e.g., the depth sensor's field of capture of the spatial data). In other words, the system may capture spatial data about the bodies of multiple users standing inside the room where the depth sensor is located and may allow them to virtually try on virtual clothing by displaying representations of the multiple users and their virtual clothing in the same image on a screen. In some example embodiments, the system may enable users who are not in the same physical room, but who have access to depth sensors, to connect via a network such that the depth sensors capture the positional information (e.g., spatial data) of different users standing in front of different depth sensors. In certain example embodiments, the networking of depth sensors may allow more than four users to be recognized in the same field of vision. In some example embodiments, the representations of the users' bodies may be displayed together on each user's screen (e.g., inserted into each view) such that each user in front of a depth sensor may see all users of the group virtual dressing room. For example, a wedding party (e.g., a group of people coordinating outfits for a wedding) that is scattered geographically may connect via networked depth sensors to virtually try on virtual bridesmaid dresses together, so that everyone can see how the wedding party would look together. In some example embodiments, the system may allow the group of people to place an aggregate order for the items that they virtually tried on in the virtual group dressing room. The order may reflect the sizes of the physical clothing items based on the system determining the body measurements of each person virtually trying on the virtual clothing items based on the spatial data captured by the depth sensors.

In some example embodiments, the system may allow the user to solicit fashion opinions via social sharing (e.g., on Twitter or Facebook). Often, a user who is shopping for clothing would like to solicit a friend's opinion about a clothing item the user is interested in. When the user is shopping by herself, this is not an option. In some example embodiments, the system may allow the user to share a video feed of the user virtually trying on virtual clothing items with his or her friends on social networks, thereby enabling the friends to provide opinions of how the virtual clothing item appears on the user. The video feed may be shared via existing social media channels (e.g., Twitter and Facebook). In some example embodiments, feedback may be provided via audio, text, social media (e.g., Twitter or Facebook), or a separate video feed displayed to the user. In certain example embodiments, the system may include a social voting mechanism to enable the user's friends to communicate to the system (e.g., by gesture, voice, or text) their approval or disapproval of a virtual clothing item as being virtually tried on by the user. In certain example embodiments, the system may tabulate the votes and display the aggregated vote totals to the user.

In various example embodiments, the system may allow the user to engage in market transactions (e.g., using the electronic market) using gestures recognized by the system. Examples of market transactions are offering an item for sale, bidding for an item, and buying an item. In some example embodiments, to prevent an accidental gesture from being interpreted as the user intending to enter into a transaction, the system may prompt the user to confirm that the gesture was intentional (e.g., by engaging in an action). In some example embodiments, the user may issue a voice command to confirm that his gesture was intentional. In other example embodiments, the user may express his or her intent to enter into a transaction by speaking a voice command together with repeating the gesture. In some example embodiments, the user may perform sequential gestures, simultaneous gestures, or a subsequent gesture to express an intent to enter into a transaction.

In various example embodiments, the system may allow the user to streamline the number of steps needed to list an item for sale. For example, the user may tap or touch an item (e.g., a physical object) and the depth sensor may capture the spatial data pertaining to the user's movement in relation to the item. In some example embodiments, the system may interpret the captured spatial data to recognize the item and the item's dimensions. Some devices (e.g., that may include a depth sensor and a camera) of the system may detect other features of the item, such as color style, or texture. Based on the captured spatial data that relates to the item, the system may recognize one or more features of the item and determine that it already has some data that pertains to the item, which data may be stored in a database. In certain example embodiments, the system may populate a search listing page with recognized features of the item. In some example embodiments, the system may map different gestures recognized by the depth sensor to different actions (e.g., actions that relate to transactions using the electronic marketplace). In certain example embodiments, the user jumping up and down once could communicate to the system that the user wants to virtually try on a random virtual outfit pulled from the electronic marketplace operator's inventory. In various example embodiments, the user performing the touchdown gesture could communicate to the system to begin calibration. In some example embodiments, the user touching an item (e.g., a clothing item) and drawing (e.g., tracing) a line around the item from a start point to an end point could instruct the system to capture spatial data that relates to the item, generate a representation of the item, and store the representation of the item (e.g., in the user's virtual closet) for a later use. In some example embodiments, the user may make a gesture with his or her hand resembling a bidding paddle to instruct the system to make a bid on an item listed with an electronic marketplace operator. In some example embodiments, the user may hold up a wallet or a payment card to instruct the system to make a payment on the user's behalf. In some example embodiments, the system will request the user to confirm the user's identity (e.g., using biometrics). In some example embodiments, the user may point to an item (e.g., a physical item in the field of view of the depth sensor or a visual representation of an item on a screen) and the system may generate a 3D model of the item either using spatial data descriptive of the item or data that the system already has stored in a database. In certain example embodiments, the system may determine the size of a box to be sent to a seller to use for shipping an item for sale based on the system determining the spatial measurements of the item for sale from the spatial data descriptive of the item for sale captured by a depth sensor.

A product may be manufactured by a manufacturer and available for purchase from a seller. For example, the product may take the form of a good (e.g., a physical object), a service (e.g., performed by a service provider), information (e.g., digital media), a license (e.g., authorization to access something), or any suitable combination thereof. An item may be a specimen (e.g., an individual instance) of the product, and multiple items may constitute multiple specimens of the product. Accordingly, a seller of a product may seek to merchandise one or more items as specimens of the product.

In merchandising an item, the seller may use a network-based system to present the item to the user of the network-based system (e.g., a potential buyer of the item). Examples of network-based systems include commerce systems (e.g., shopping websites), publication systems (e.g., classified advertisement websites), listing systems (e.g., auction websites), and transaction systems (e.g., payment websites). The item may be presented within a document (e.g., a webpage) that describes the item or product. In shopping for an item, one or more users may search the network-based system (e.g., by submitting queries) for such documents or similar information regarding details of the item or product.

FIG. 1 is a chart illustrating examples of possible actions in a virtual dressing room 105, according to some example embodiments. The electronic marketplace operator, in some example embodiments, may recommend a virtual outfit or a virtual clothing item to the user to virtually try on. In certain example embodiments, the size of a recommended virtual clothing item may correspond to the user's body measurements (e.g., provided by the user or determined based on the spatial data captured by the depth sensor). For example, a recommended real clothing item may be presented to the user as a representation of the recommended real clothing item, adjusted (e.g., scaled) to the clothing item's brand size closest to the user's body measurements, being overlaid (e.g., mapped) on a representation of the user. In some example embodiments, the representation of the item of clothing may be scaled to correspond to the particular user's body measurements.

As noted above, the representation of the item may be two-dimensional or three-dimensional. The representation of the user may also be two-dimensional (e.g., a video feed, a photograph of the user, or a 2D avatar of the user) or three-dimensional (e.g., a 3D avatar of the user). In some example embodiments, the representation of the recommended clothing item may be displayed on a virtual clothing rack. In certain example embodiments, the user may have a choice to view the virtual outfit, either displayed on the virtual clothing rack or overlaid on a representation of the user.

The user may look at a recommended virtual clothing item or virtual outfit, or may browse through a number of suggested virtual outfits 110 or virtual clothing items (e.g., based on deals, stylists, or popularity). In some example embodiments, the user may change one piece of a virtual outfit 115 for another. Because the user may prefer a color different from the color of the recommended virtual clothing item or virtual outfit, the user may change the color 120 (e.g., by making a gesture to invoke a color picker menu or by issuing a voice command) of the virtual clothing item or virtual outfit that has been recommended by the system. In some example embodiments, the user may choose to change another detail 125 (e.g., texture, pattern, or size) of the presented virtual clothing item or virtual outfit. The user may also want to share 130 (e.g., in a virtual fashion show using a social media channel) the recommended virtual outfit or virtual clothing item with the user's friends (e.g., to get their opinion on the recommendation or on the fit of the virtual outfit or virtual clothing item, or to make a further recommendation to the user's friends). As noted above, the sharing 130 may occur using public social media platforms (e.g., Facebook or Twitter) or a private network limited to a group of users.

In some example embodiments, the user may be interested in finding a specific clothing item 135 (e.g., to create an outfit or to dress a bridal party). The present method and system may allow the user to match something the user owns 140 to an additional clothing item that may be listed on the electronic marketplace (e.g., a dress the user owns to a pair of shoes for sale on the electronic marketplace). In various example embodiments, the user may match the item he already owns to a desired item by color, size, or other detail 145 (e.g., texture, pattern, or style) using the virtual dressing room 105. Furthermore, the user may match the clothing items by occasion 150 (e.g., a formal occasion, such as a wedding). The user may also collaborate on an outfit 155 with others (e.g., a friend on Facebook or Twitter, or a stylist). In some example embodiments, several users may coordinate outfits 160 (e.g., outfits for a bridal party or for a family photograph).

In some example embodiments, the user may choose to create a virtual closet 165. For example, the user may use the system to create representations of clothing items in the user's physical closet and save them in the user's virtual closet. In some example embodiments, this would allow the user to remotely access the user's virtual closet. For example, using a mobile device, the user may look up items of virtual clothing in the user's virtual closet to match to real items of clothing while shopping in a real store. In another example, the user may match items of clothing available for sale on an electronic marketplace to the clothes in the user's virtual closet without physically trying on clothes or standing in front of a depth sensor.

Accordingly, the creation of a virtual closet 165 may allow the user to add virtual clothing items to the user's virtual closet 170. In some example embodiments, the user's gesture representing adding a virtual clothing item to the user's virtual closet may be correlated to the action of placing an order to buy the physical item of clothing that corresponds to the virtual clothing item using the electronic marketplace. In other example embodiments, the user's gesture representing adding an item of virtual clothing to the user's virtual closet may be correlated to adding the item of virtual clothing to a "like" list, also known as a wish list (e.g., a list of items to be considered for purchasing in the future).

In addition, the user may also search the user's virtual closet 175. In some example embodiments, the user may organize the representations of the virtual clothing items in the user's virtual closet (e.g., by type of item, color, style, texture, size, or occasion).

Furthermore, in certain example embodiments, the user may sell his or her clothes 180 (e.g., using the electronic marketplace). For example, the user, wearing a clothing item he or she wants to sell, may stand in front of the depth sensor and make a gesture that is correlated to a command to list the clothing item for sale on the electronic marketplace. Based on determining that the user's gesture corresponds to the command to list the clothing item for sale on the electronic marketplace, the system may initiate the listing of the clothing item for sale on the electronic marketplace on behalf of the user. In some example embodiments, the system may create a 3D representation of the clothing item for sale and include the 3D representation of the clothing item in the listing that describes the clothing item for sale. In other example embodiments, the user may display the real clothing item for sale to the depth sensor without wearing the real clothing item for sale and the system may create a listing for the displayed clothing item, which listing may include a representation (e.g., 2D or 3D) of the displayed clothing item.

Figure 2:
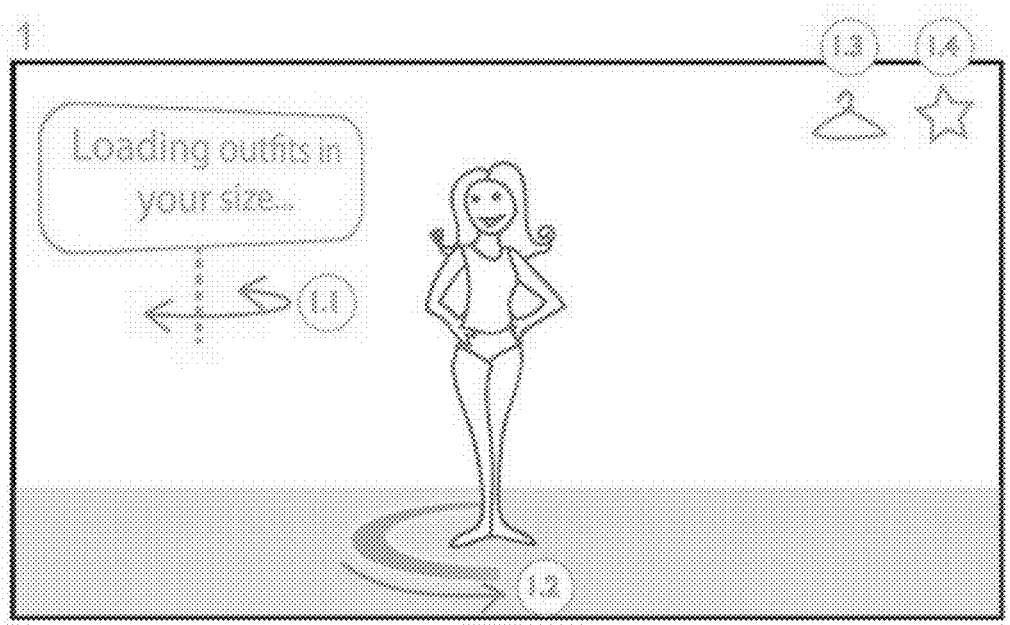
FIG. 2 is a conceptual diagram discussing an initial welcome state, according to some example embodiments.

The system may allow for different ways to display the user on a screen. In some example embodiments, the user interface may display a live camera feed showing an image of the user. In other example embodiments, a 2D or 3D avatar of the user may be displayed. FIG. 2 is a conceptual diagram discussing an initial welcome state, according to some example embodiments. In various example embodiments, the system may present a graphical user interface to allow the user to activate the system. In some example embodiments, the user may assume an initial welcome state to activate the system. In other example embodiments, the user may make an initial welcome gesture to activate the system. In certain example embodiments, the user may activate the system with the use of a voice command.

Upon activation, in some example embodiments, the depth sensor may acquire (e.g., capture or receive) spatial data about the user standing in front of the depth sensor. The system may display a representation of the user within the virtual dressing room (e.g., using a live camera feed or an avatar) on a screen (e.g., of a TV set, computer monitor, or mobile device), according to some example embodiments. Because the acquired spatial data may include data that may allow the system to determine the user's body measurements, the representation of the user mimics closely the user's body shape. In some example embodiments, the system may also determine the user's one or more sizes (e.g., the user's size may be different for different brands of clothing) based on the acquired spatial data. While the system loads outfits in the user's size, the system may communicate to the user a status update. For example, the user may be presented with a statement "Loading outfits in your size . . . " and an information plane 1.1 that may rotate back and forth while loading outfits. Also, a loading ring 1.2 may be shown on the ground plane. Further, the user may be presented with a contextual control, such as a virtual navigation button 1.3 to the user's virtual closet (e.g., "My closet") or a virtual share button 1.4 (e.g., "Fashion Show").

Figure 3:
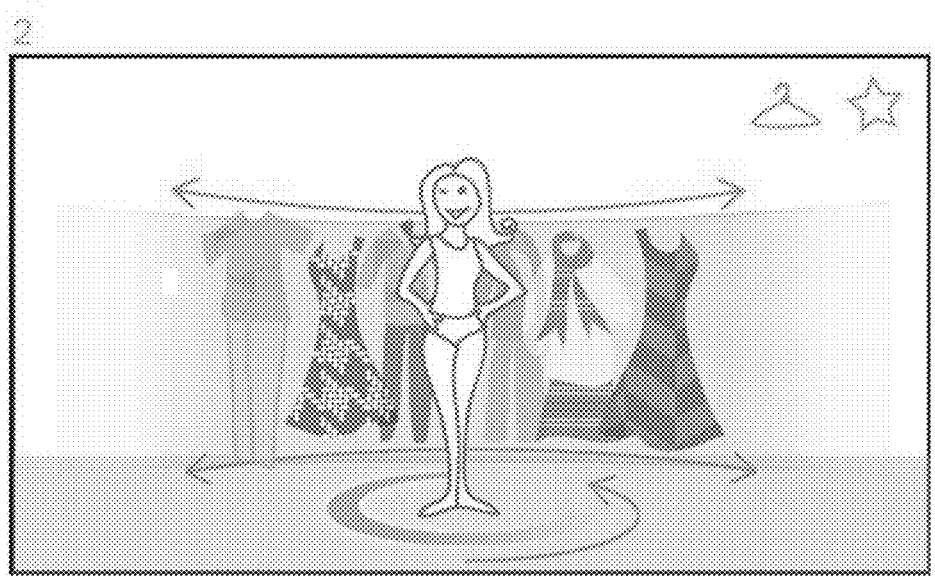
FIGS. 3-4 are conceptual diagrams discussing a virtual rack of clothes, according to some example embodiments.
Figure 4:

FIGS. 3-4 are conceptual diagrams discussing a virtual rack of clothes, according to some example embodiments. In various example embodiments, the user may employ gestures to interact with virtual clothing items in a virtual dressing room. As shown in FIG. 3, the user may make a gesture to cause the system to load virtual clothing outfits on a virtual clothing rack by spreading (e.g., opening out) from the center. For example, the representation of the user is centrally located and the virtual clothes are being loaded behind the user's representation and spread out as more virtual clothes are loaded.

As shown in FIG. 4, in some example embodiments, when the virtual outfits finish loading on the virtual rack, a virtual outfit may automatically appear overlaid on the representation of the user. The user may be presented with an option to buy 3.1 the outfit or item (e.g., presented or selected), find out the price 3.2 of the outfit or item, add the virtual outfit or virtual clothing item to the user's virtual closet 3.3, or select the highlighted item 3.4.

Figure 5:
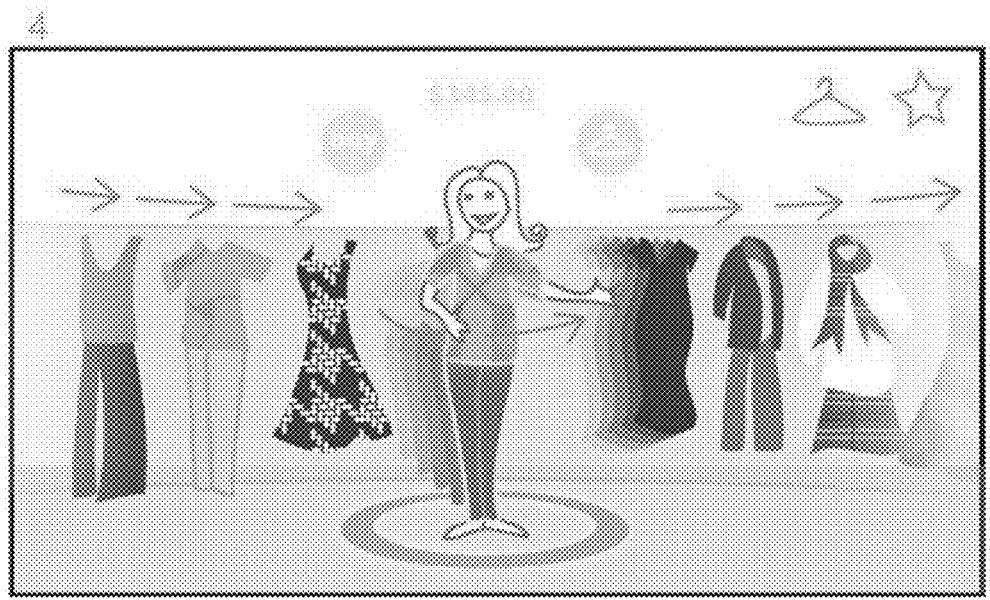
FIG. 5 is a conceptual diagram illustrating a gesture, according to some example embodiments.

FIG. 5 is a conceptual diagram illustrating a gesture, according to some example embodiments. The user may make a swiping movement which may correspond to a command to move a virtual outfit on the virtual rack. In some example embodiments, a longer swipe may move a larger number of virtual outfits with one swipe and a shorter swipe may move a smaller number of virtual outfits with one swipe. In some example embodiments, the contextual controls (e.g., Buy 3.1, price 3.2, and Add to Closet 3.3) may be dimmed between virtual outfit selections.

Figure 6:
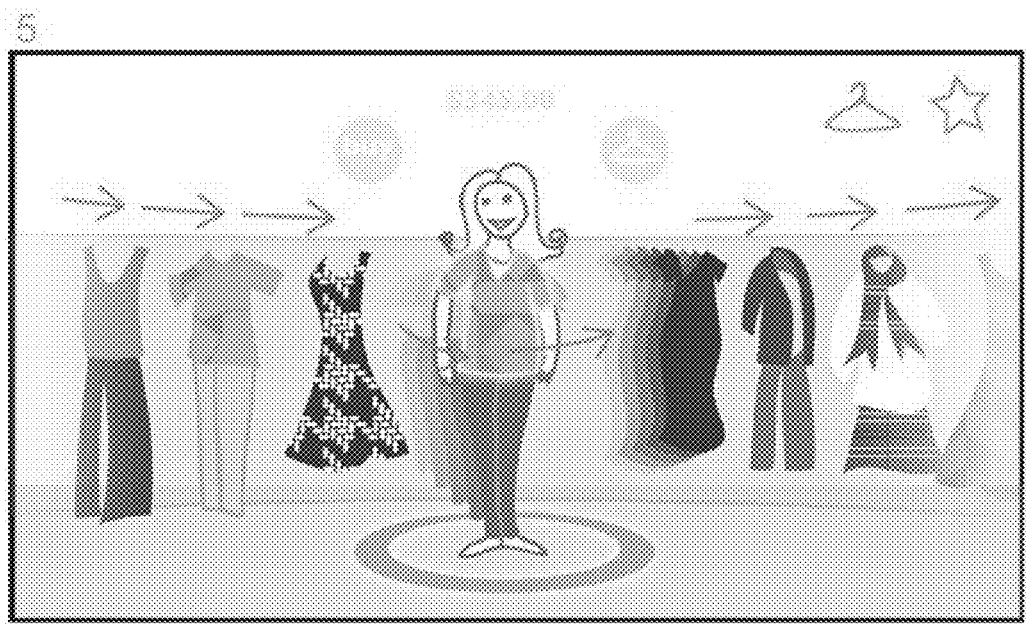
FIG. 6 is a conceptual diagram illustrating an action, according to some example embodiments.

FIG. 6 is a conceptual diagram illustrating an action, according to some example embodiments. In response to the swiping gesture as described above with respect to FIG. 5, the system may auto-increment by one virtual outfit, rotating clockwise (e.g., may move the virtual outfits on the rack clockwise one at a time).

Figure 7:
FIG. 7 is a conceptual diagram illustrating a gesture, according to some example embodiments.

FIG. 7 is a conceptual diagram illustrating a gesture, according to some example embodiments. When the user sees a virtual outfit he or she may want to virtually try on, the user may make a grab and drag gesture directed to the respective virtual outfit. The gesture may represent a command to the system to initiate the corresponding action (e.g., grab or select at item on the rack).

Figure 8:
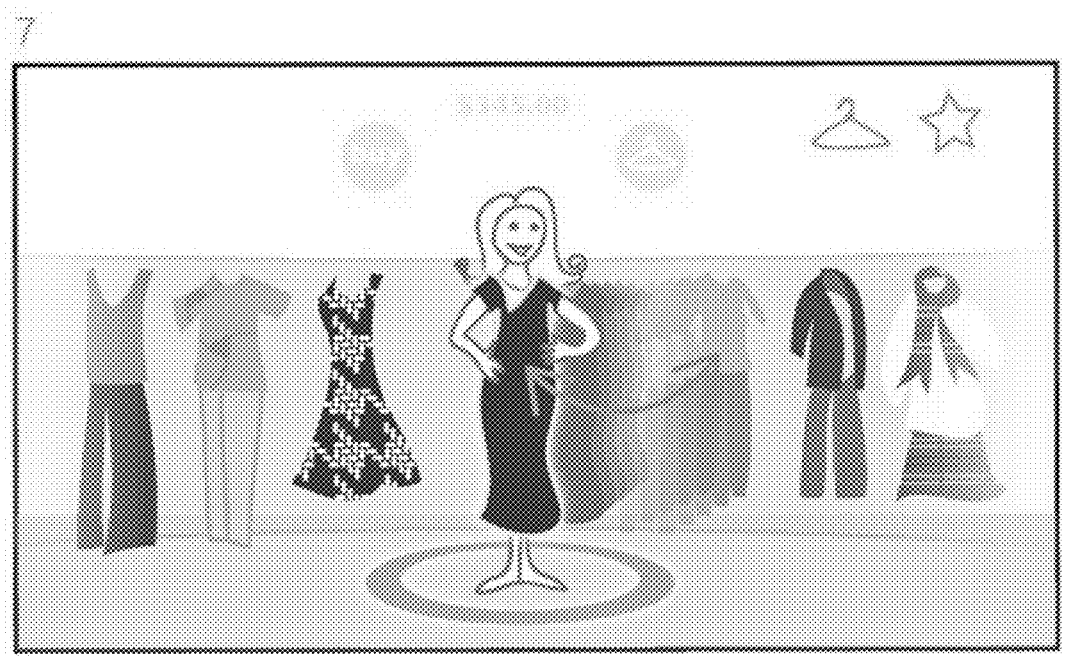
FIG. 8 is a conceptual diagram illustrating a gesture and an action, according to some example embodiments.

FIG. 8 is a conceptual diagram illustrating a gesture and an action, according to some example embodiments. In response to the grab and drag gesture as described above with respect to FIG. 7, the system may map the virtual outfit selected by the user to the representation of the user (e.g., by overlaying the representation of the outfit on the representation of the user). In some example embodiments, the mapping of the selected virtual outfit to the representation of the user (e.g., pulling or putting the virtual outfit on) may cause the current virtual outfit and selected virtual outfit to swap places (e.g., the user wears the selected virtual outfit and the current virtual outfit is moved to the rack, replacing the selected virtual outfit).

Figure 9:
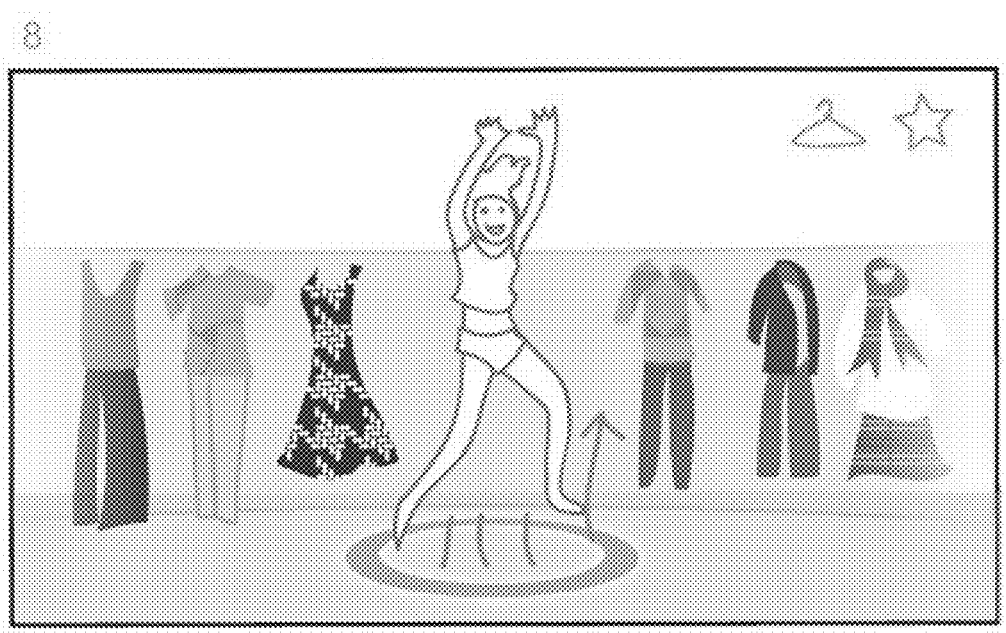
FIG. 9 is a conceptual diagram illustrating a gesture, according to some example embodiments.

FIG. 9 is a conceptual diagram illustrating a gesture, according to some example embodiments. The user may employ a gesture to request the system to mix the order in which the virtual outfits are displayed on the virtual clothing rack. For example, the user may jump up and down to cause the system to randomize the presentation order of the virtual outfits (e.g., to mix the virtual outfits in a random fashion). In certain example embodiments, the system may mix the items based on knowledge it may have about the user (e.g., the user's preferences in clothing or the user's upcoming scheduled events).

Figure 10:
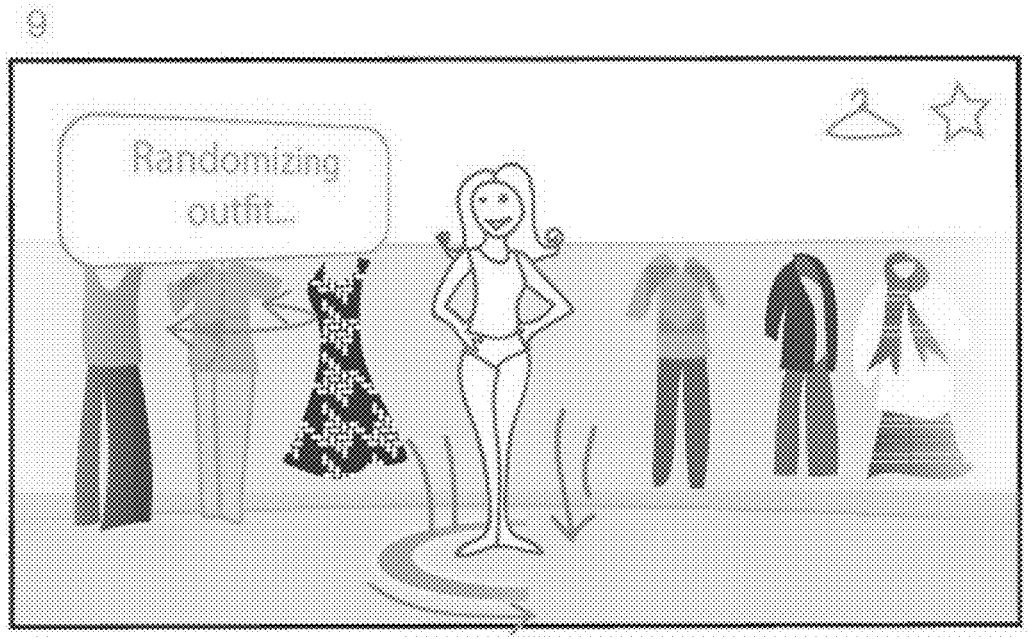
FIG. 10 is a conceptual diagram illustrating an action, according to some example embodiments.

FIG. 10 is a conceptual diagram illustrating an action, according to some example embodiments. In response to the gesture to mix the displayed virtual outfits as described above with respect to FIG. 9, the system may display the presented virtual outfits in a different order.

Figure 11:
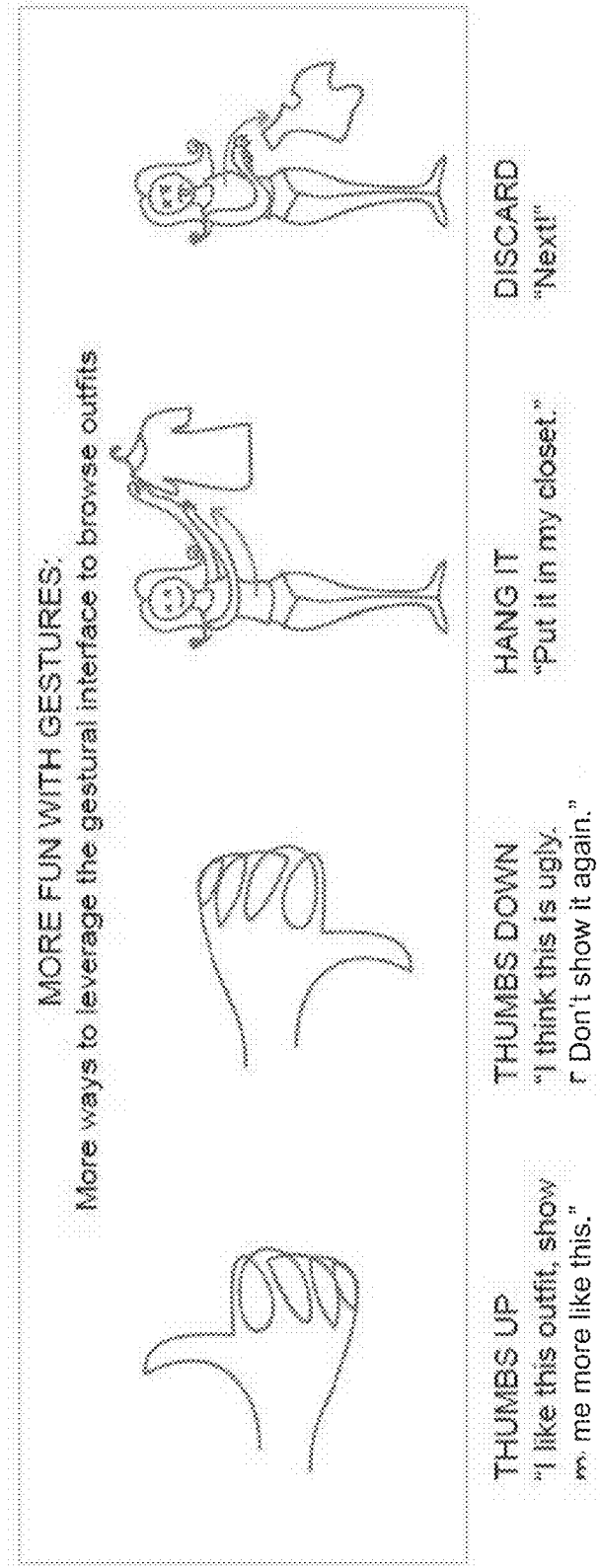
FIG. 11 is a conceptual diagram illustrating gestures, according to some example embodiments.

FIG. 11 is a conceptual diagram illustrating gestures, according to some example embodiments. As shown, the user may employ additional gestures to engage with the virtual clothing items in the user's virtual dressing room. For example, the user may use the thumbs up or thumbs down gestures to communicate to the system whether the user likes or dislikes, respectively, a recommended item of virtual clothing. In some example embodiments, the thumbs up gesture further communicates to the system a request to show more items similar to the liked item. In some example embodiments, the thumbs down gesture further communicates to the system a request to not show items similar to the disliked item again.

Another example of a gesture the user may employ in the virtual dressing room is the "hang it" gesture, as shown in FIG. 11. The "hang it" gesture directed to a particular item of virtual clothing may command the system to place the virtual clothing item in the user's virtual closet. In some example embodiments, the "hang it" gesture indicating a physical item of clothing may cause the system to generate a representation (e.g., 3D or 2D) of the physical item of clothing and to place the representation of the physical item of clothing into the user's virtual closet. In certain example embodiments, the user may employ a gesture to list the physical item of clothing for sale on the electronic marketplace and include the representation of the physical item of clothing as part of the description of the physical item of clothing in the listing.

A further example of a gesture the user may employ in the virtual dressing room is the "discard" gesture, as shown in FIG. 11. This gesture may be used to represent the user's intention to move to (e.g., consider) a next item.

Figure 12:
FIG. 12 is a conceptual diagram illustrating a gesture, according to some example embodiments.

FIG. 12 is a conceptual diagram illustrating a gesture, according to some example embodiments. In some example embodiments, tapping an item (e.g., a shirt the user is wearing) may signal a request to select that item.

Figure 13:
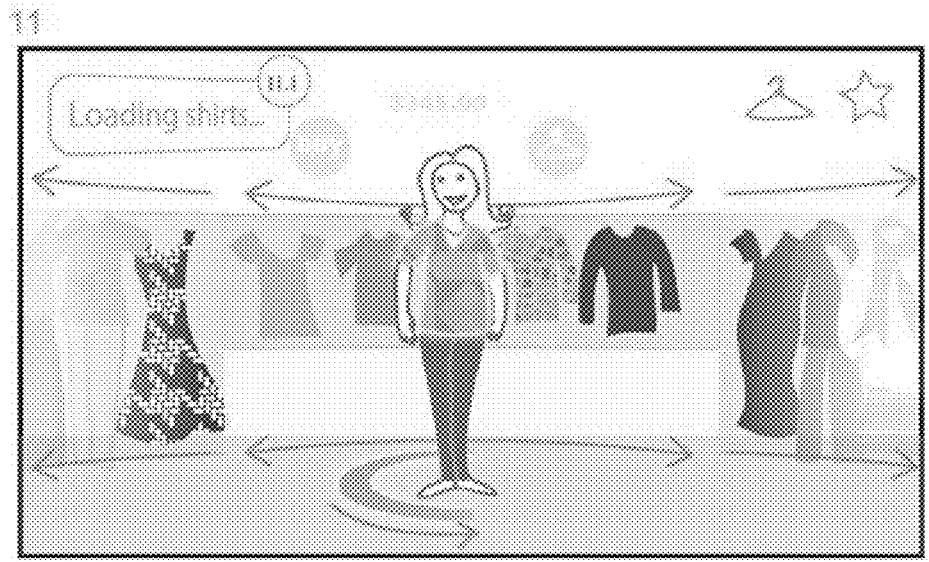
FIGS. 13-14 are conceptual diagrams illustrating an action, according to some example embodiments.
Figure 14:
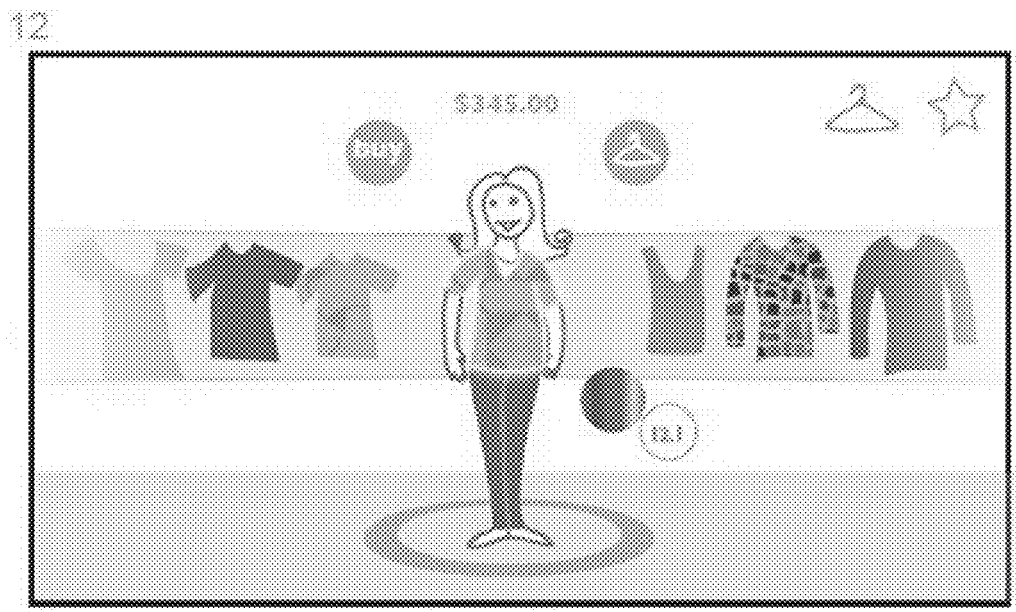

FIGS. 13-14 are conceptual diagrams illustrating an action, according to some example embodiments. As shown in FIG. 13, based on the user tapping his or her shirt as described above with respect to FIG. 12, the virtual outfit rail may split and rotate off the stage as a virtual shirt rail may expand out from the center (e.g., the user position). In some example embodiments, a text plane 11.1 stating "Loading shirts . . . " may be displayed to textually communicate a status update to the user.

FIG. 14 illustrates a virtual rail of virtual shirts that have finished loading. This view may show that the focus is on the individual virtual clothing item (e.g., virtual shirt) versus the virtual outfit (e.g., which has moved off the display area). In some example embodiments, the system may present the user with another contextual control, the color picker 12.1. In some example embodiments, the system may also present another contextual control, such as a pattern selector. The functionality of the color picker 12.1 is described below with respect to FIGS. 16-17.

Figure 15:
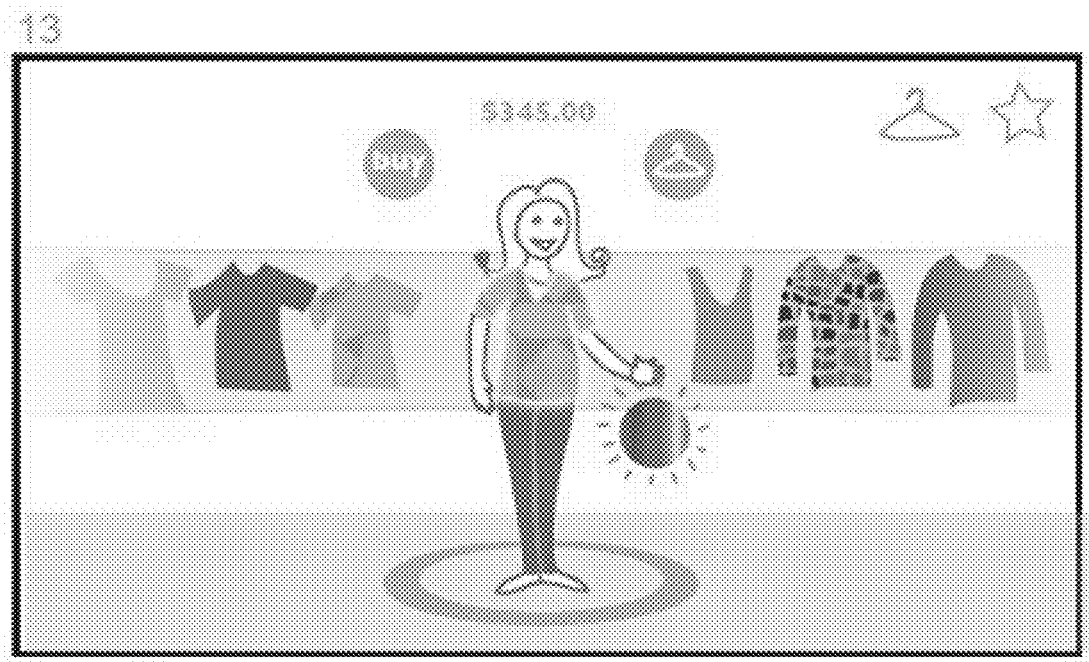
FIG. 15 is a conceptual diagram illustrating a gesture, according to some example embodiments.

FIG. 15 is a conceptual diagram illustrating a gesture, according to some example embodiments. Upon being presented with the color picker 12.1 as described above with respect to FIG. 14, the user may select the color picker 12.1 (e.g., by tapping the color picker 12.1) to view a range of colors.

Figure 16:
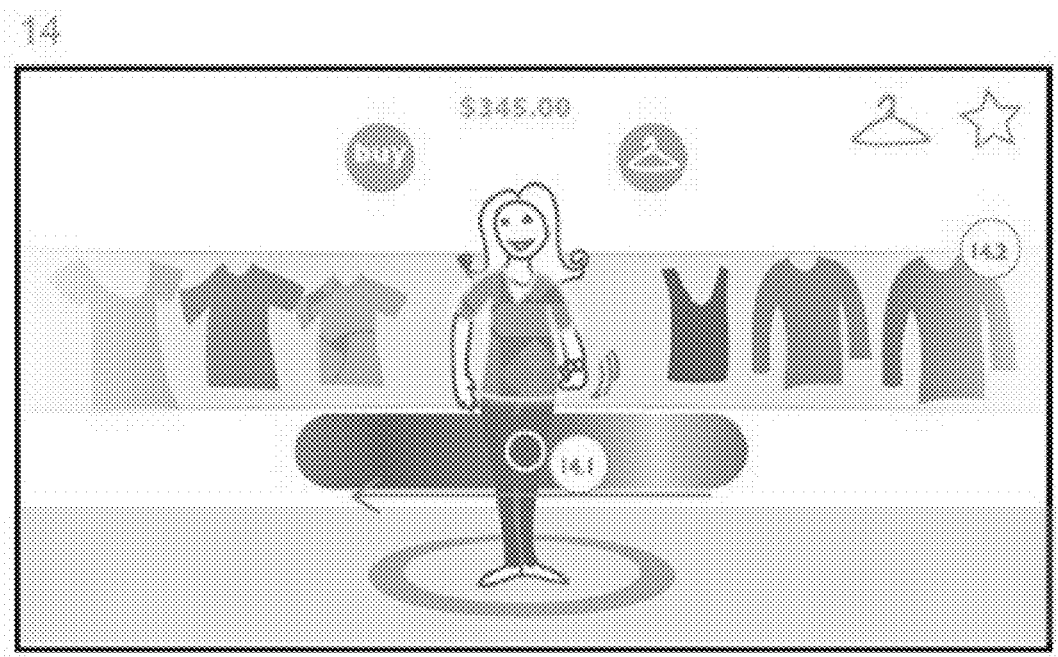
FIG. 16 is a conceptual diagram illustrating an action, according to some example embodiments.

FIG. 16 is a conceptual diagram illustrating an action, according to some example embodiments. As a result of the user selecting the color picker 12.1 as described above with respect to FIG. 15, the color picker 12.1 may expand open to display a range of colors. In some example embodiments, the user may make a scrubbing motion over the color picker 12.1 to cause the system to scroll through the display of colors. In certain example embodiments, a circle 14.1 may highlight the current selection on the color picker 12.1 (e.g., the currently chosen color). In certain example embodiments, when the user selects a color on the color picker 12.1 (e.g., by tapping the color), all the virtual shirts displayed on the virtual shirt rail in the virtual dressing room may change their color to show off the potential for search (e.g., by color or pattern).

Figure 17:
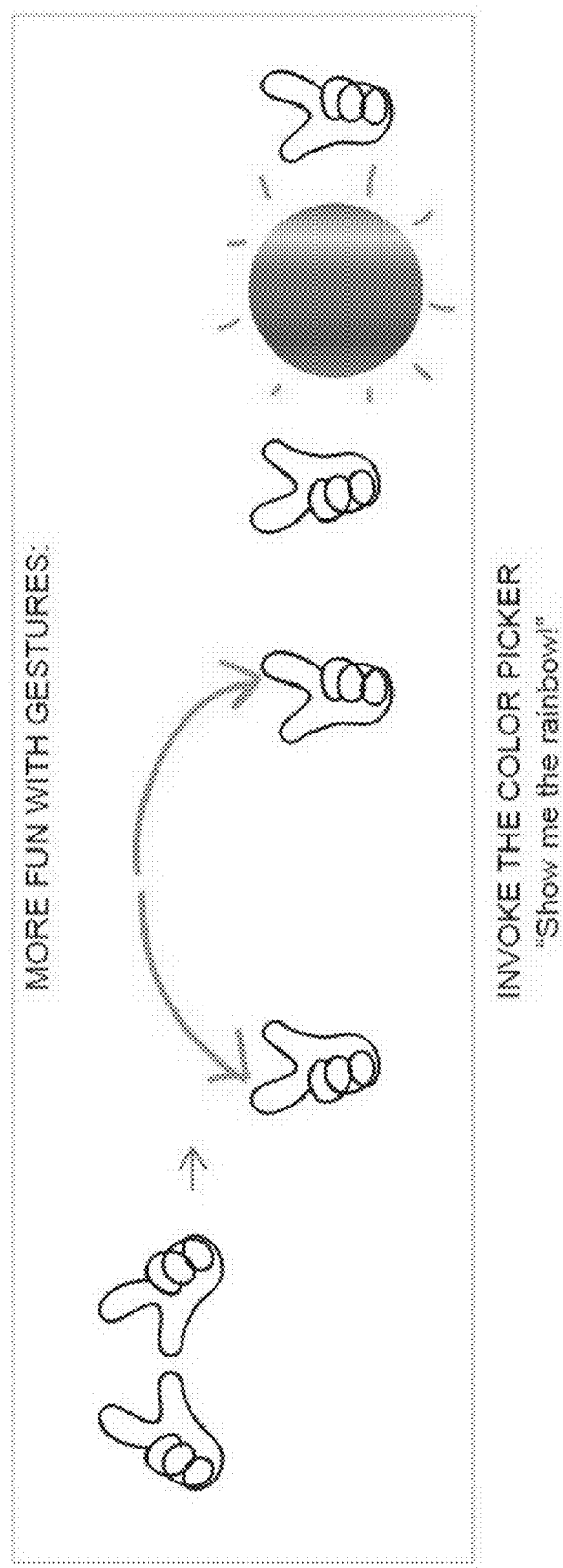
FIG. 17 is a conceptual diagram illustrating a gesture, according to some example embodiments.

FIG. 17 is a conceptual diagram illustrating a gesture, according to some example embodiments. In addition to the color picker 12.1 being displayed when the user focuses on a particular type of item as shown and described above with respect to FIG. 14, the user may invoke the color picker 12.1 at any point while in the virtual dressing room. In certain example embodiments, the user may make the gesture illustrated in FIG. 17 (e.g., using the thumb and forefinger of each hand, the user may start the gesture with the respective digits touching and move the hands apart in an arc) to cause the system to display the color picker 12.1.

Figure 18:
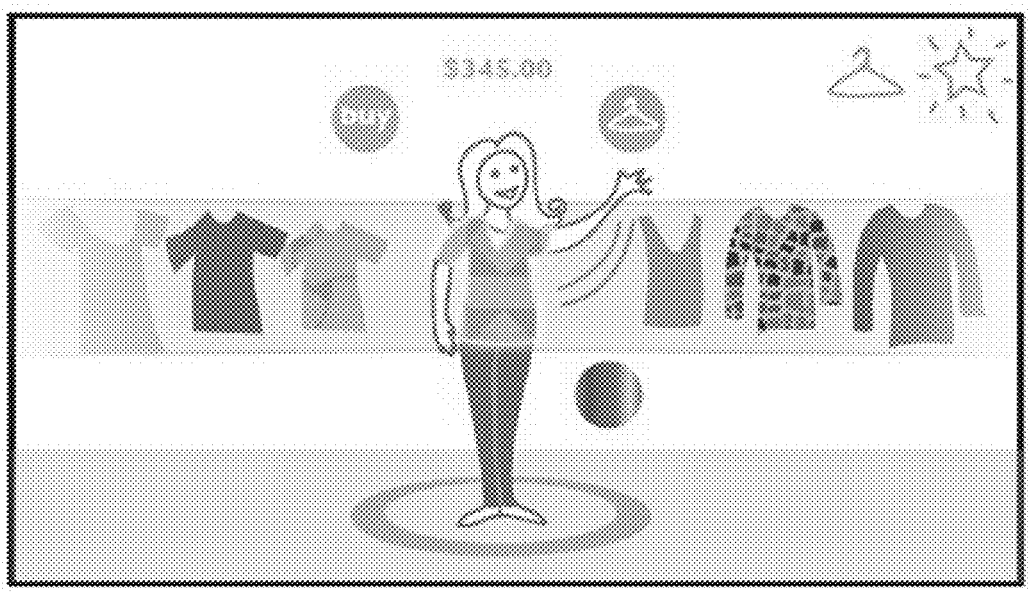
FIG. 18 is a conceptual diagram illustrating a gesture, according to some example embodiments.

FIG. 18 is a conceptual diagram illustrating a gesture, according to some example embodiments. The user may want to have a virtual fashion show for the user's social network friends from the user's virtual dressing room (e.g., to get the friends' opinions as to a virtual outfit before the user buys the outfit). The virtual fashion show could be based on the current virtual outfit or the user's closet of saved virtual outfits. To invoke the virtual fashion show option the user may virtually hit the virtual share button (e.g., the contextual control in the upper right corner) 1.4 described above with respect to FIG. 2.

Figure 19:
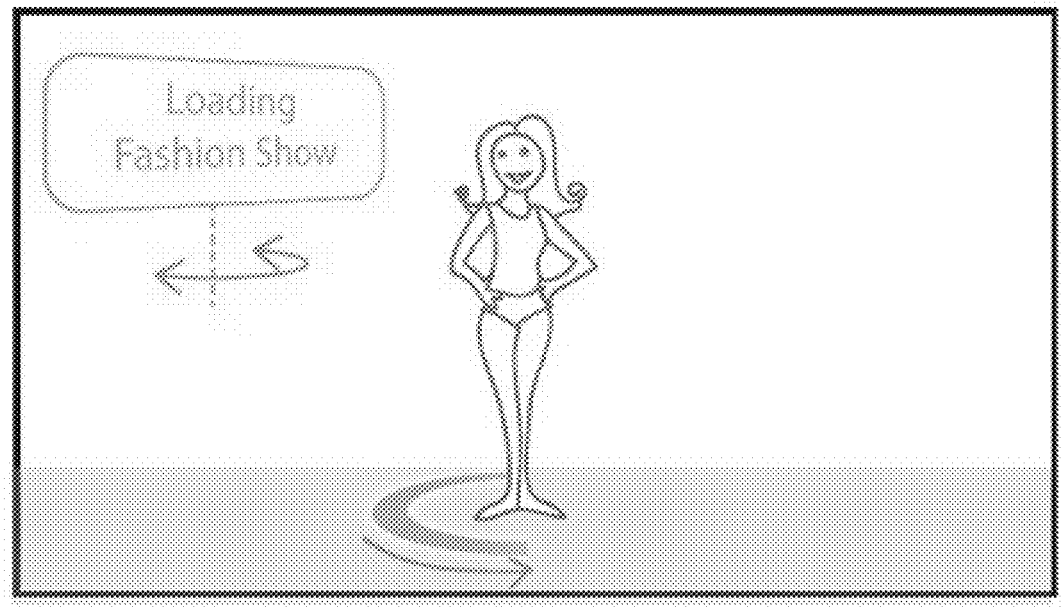
FIGS. 19-20 are conceptual diagrams illustrating actions, according to some example embodiments.
Figure 20:
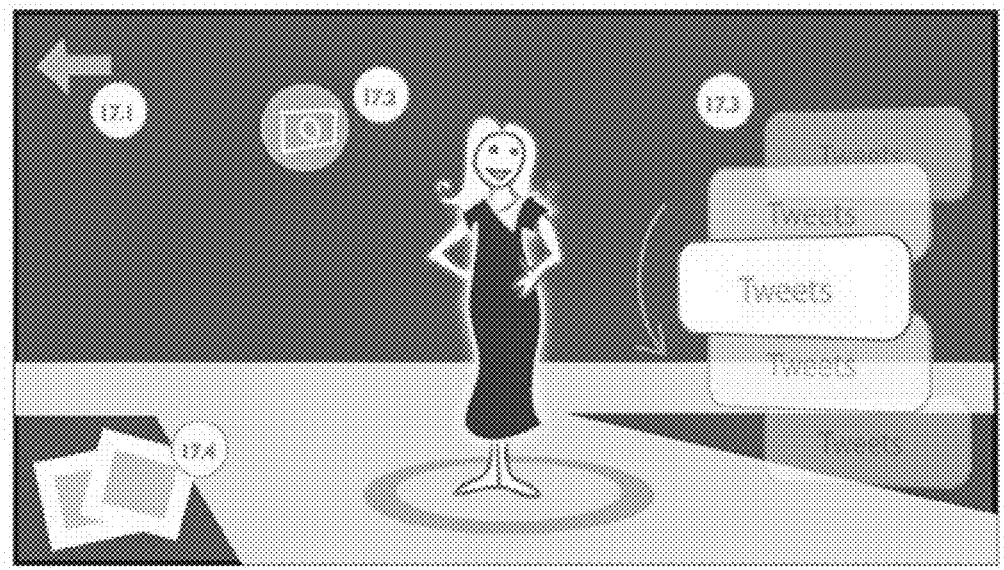

FIGS. 19-20 are conceptual diagrams illustrating actions, according to some example embodiments. As shown in FIG. 19, in response to the user selecting the virtual share button 1.4, the system may load tweets and virtual outfits. In some example embodiments, a text plane stating "Loading Fashion Show" may be displayed to textually communicate a status update to the user.

As shown in FIG. 20, the system displays a selected virtual outfit mapped to the representation of the user in the context of a virtual fashion show with a virtual catwalk (e.g., to show a virtual clothing item to the user's friends on social networks, thereby enabling the friends to provide opinions on how the virtual clothing item appears on the user). In some example embodiments, the system may use an avatar of the user on which the selected virtual outfit is overlaid. In other example embodiments, the system may show a video feed of the user virtually trying on virtual clothing. The video feed may be shared via existing social media channels (e.g., Twitter and Facebook). In some example embodiments, feedback may be provided via audio, text, social media channels or separate video feeds displayed to the user (e.g., Tweets 17.3). In certain example embodiments, the system may include a social voting ability (e.g., mechanism) to enable users to communicate to the system (e.g., by gesture, voice, or text) their approval or disapproval of a virtual clothing item displayed on the representation of the user. In certain example embodiments, the system may tabulate the votes and display the aggregated vote totals to the user.

Some example embodiments may allow the user to have a snapshot taken by activating the camera contextual control 17.2 with a gesture. Alternately, the user may activate the camera with a voice command (e.g., by saying "Cheese!") Also, the virtual fashion show with the virtual catwalk view may have a contextual control 17.1, the activation of which may take the user back to a prior view (e.g., the virtual outfit picker view).

Figure 21:
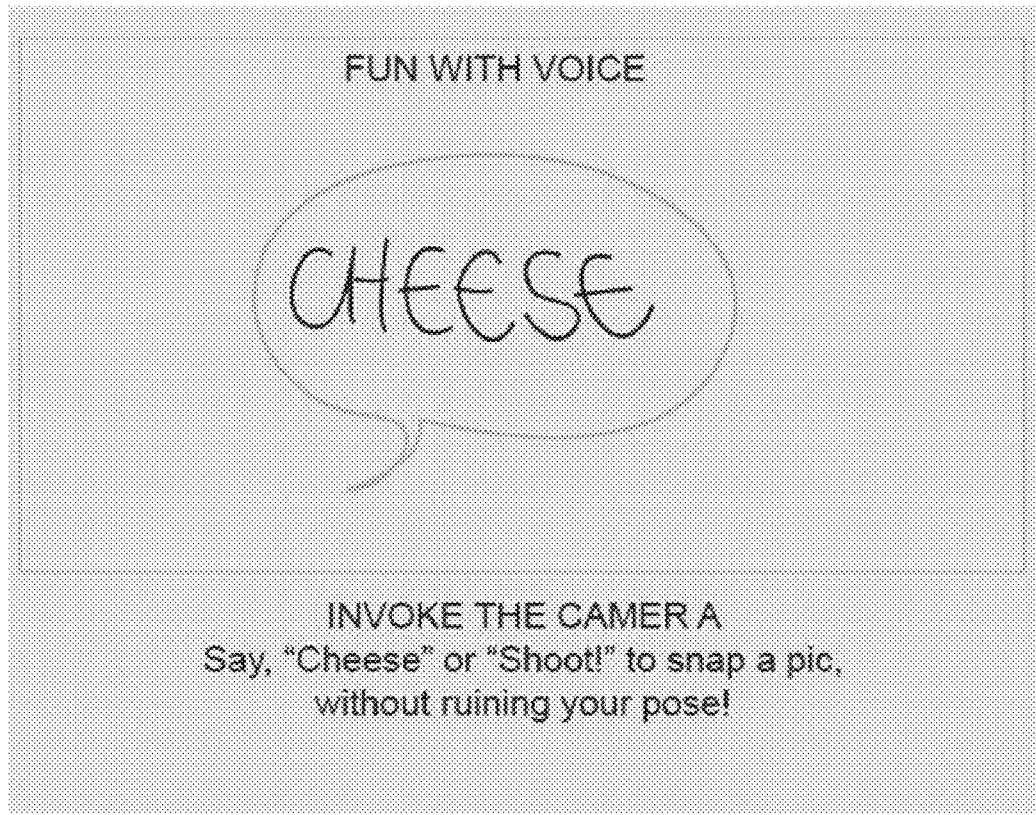
FIG. 21 is a conceptual diagram illustrating issuance of a voice command, according to some example embodiments.

FIG. 21 is a conceptual diagram illustrating issuance of a voice command, according to some example embodiments. As described above with respect to FIG. 20, the user may invoke a camera using a voice command rather than using a gesture. This may allow the user to have a picture taken of the user virtually trying on virtual clothes without ruining his or her pose.

Figure 22:
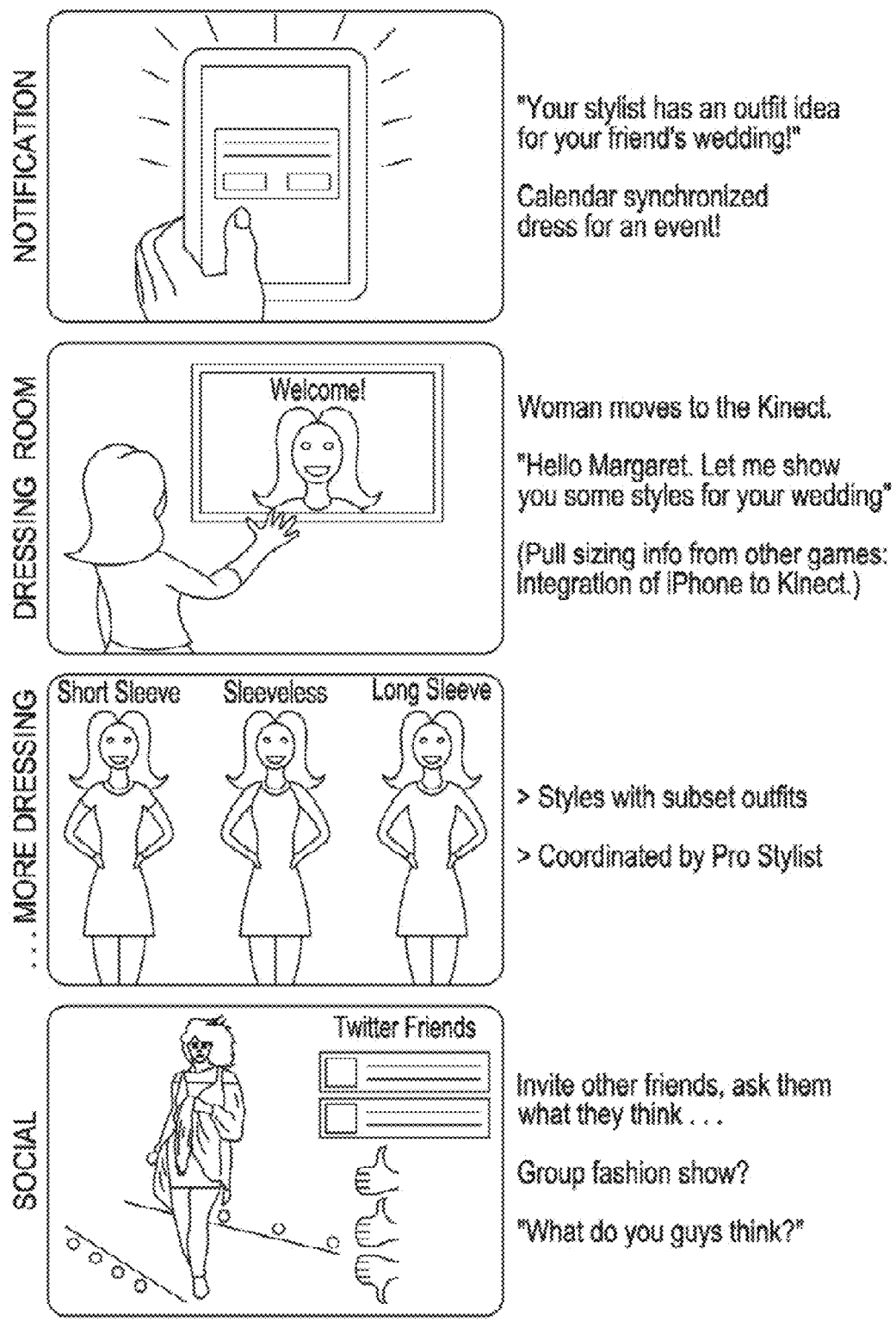
FIGS. 22-23 are conceptual diagrams illustrating the use of the present method and system in the context of curated recommendations and group virtual dressing rooms, according to some example embodiments.
Figure 23:
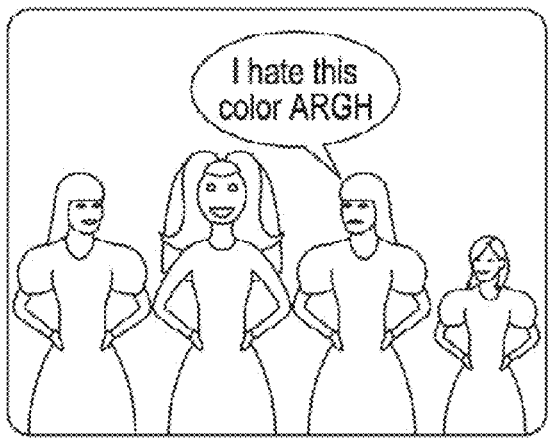
Figure 23:
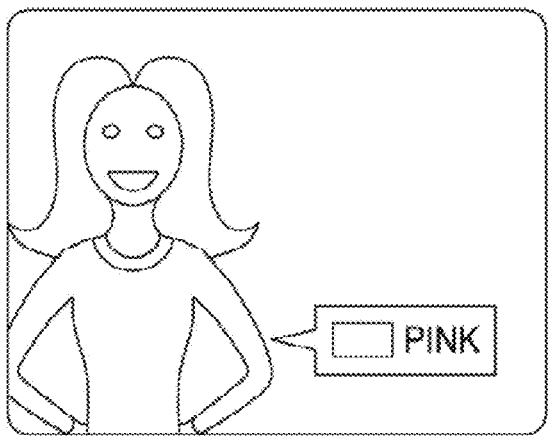
Figure 23:
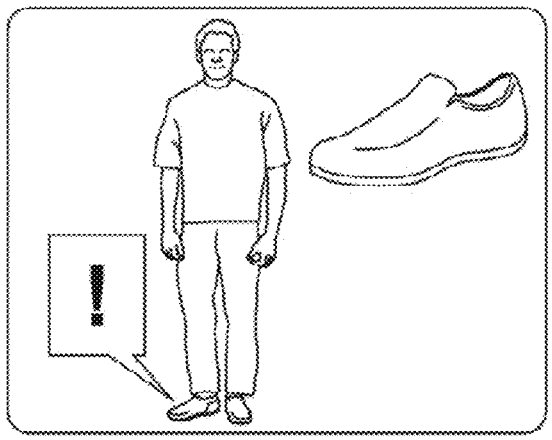

FIGS. 22-23 are conceptual diagrams illustrating the use of the present method and system in the context of curated recommendations and group virtual dressing rooms, according to some example embodiments. In various example embodiments, the system may provide curated recommendations to the user (e.g., recommendations by a stylist or another expert). These recommendations may be, for example, style-based. In certain example embodiments, these curated recommendations may be based on the system learning about the user's likes and dislikes. For example, the system may determine the user's affinity for a type of item (e.g., skirts, dresses, shoes, or jewelry) or characteristic of an item (e.g., color, pattern, or texture) based on tracking the amount of time the user spends examining a representation of an item displayed to the user. In another example, the system may determine the affinity for an item based on the user viewing a representation of the item more than once. The system, in certain example embodiments, may recommend certain items based on the determined affinity of the user for particular items.

As shown in FIG. 22, in some example embodiments, the system may send a notification to the user's mobile device informing the user of an available curated recommendation (e.g., the statement "your stylist has an outfit idea for your friend's wedding!") In some example embodiments, the system may allow for a calendar synchronization option. In various example embodiments, a stylist may show the user some recommended styles (e.g., the statement "Let me show you some styles for your wedding.") In certain example embodiments, the system may provide sizing information (e.g., the user's body measurements) based on storing the user's body measurement data during the user's prior interaction with the system (e.g., user's body measurement data determined based on the spatial data captured by the system's depth sensor). Also, in certain example embodiments, the user may both receive curated recommendations on the user's mobile device and use the mobile device to engage with the virtual dressing room.

As further shown in FIG. 22, the user may be presented with different styles, including subset virtual outfits that were coordinated by a professional stylist. The user may also invite friends on social networks to view the user's virtual fashion show and communicate to the user what they think about a particular virtual outfit.

As shown in FIG. 23, in various example embodiments, a group of people may use the depth sensing technology of the present system to coordinate their outfits (e.g., for a wedding dress party). As noted above, in some example embodiments, the depth sensor may recognize up to four people in the same field of vision (e.g., the depth sensor's field of capture). The system may allow multiple people to virtually try on virtual clothing items and may display representations of the multiple people with their virtual clothing in the same image. In some example embodiments, the system may enable different users who are not in the same physical room but who have a depth sensor to connect via a network such that the depth sensors capture the positional information of different users standing in front of different depth sensors. The captured data may be superimposed (e.g., inserted) into each view such that each person in front of a depth sensor may see all users connected via the network. In certain example embodiments, the networking of depth sensors may allow more than four users to be recognized in the same field of vision. In various example embodiments, the system may allow multiple people to virtually try on virtual outfits together. For example, a wedding party (e.g., a group of people coordinating outfits for a wedding) that is scattered geographically may connect via networked depth sensors to virtually try on virtual bridesmaid dresses together. This may allow each person of the respective wedding party to see how the wedding party would look together. As further shown in FIG. 23, in some example embodiments, the professional recommendations may extend to color suggestions (e.g., "This shade of pink goes better with your eyes . . . ") and shoe suggestions (e.g., "These shoes aren't wide enough for your feet.")

Figure 24:
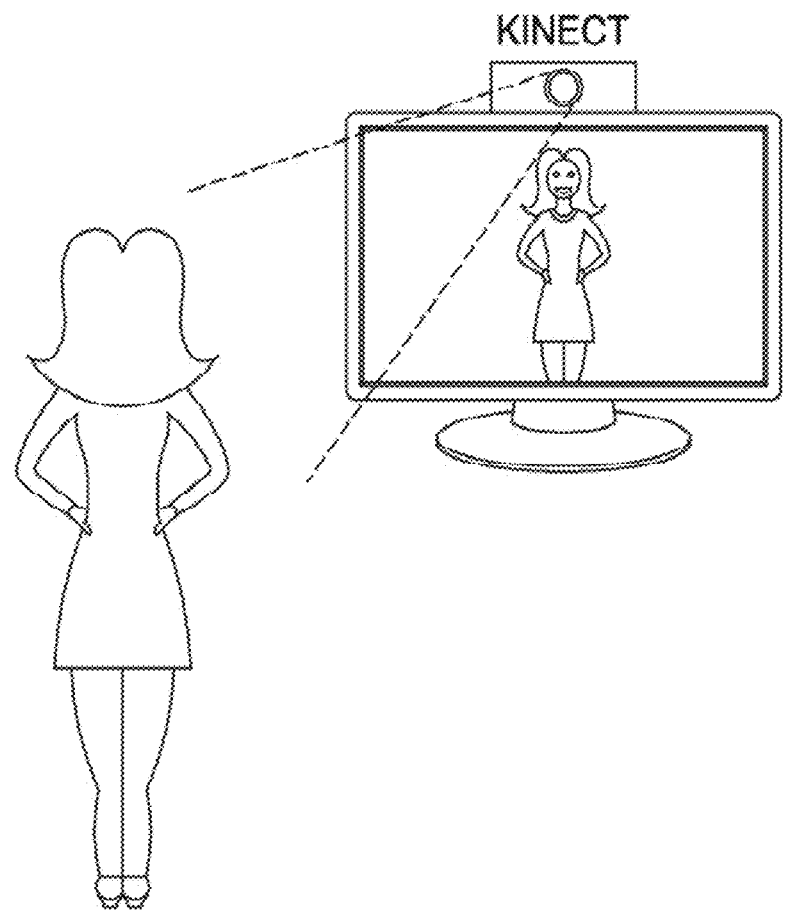
FIG. 24 is a conceptual diagram illustrating a position of a user in relation to a depth sensor (e.g., Microsoft™ Kinect™) of the present method and system, according to some example embodiments.

FIG. 24 is a conceptual diagram illustrating a position of the user in relation to a depth sensor (e.g., the Kinect) of the present system, according to some example embodiments. In certain example embodiments, the depth sensor that may be used with the system is the Microsoft Kinect. To allow the Kinect to capture the spatial data about the user and the user's surroundings, the user may be positioned inside a predetermined distance range from the Kinect (e.g., 6-8 foot clearance). Using the Kinect, a 3D representation of the environment may be generated by emitting a matrix of infrared dots. In various example embodiments, by observing how the size, brightness, and distortion of the dots are viewed in the space, models (e.g., 3D or 2D representations) of the body of the user may be generated at different points in time. Additional details about the models of the body of the user are described below with respect to FIGS. 25-27 and 30-34.

Figure 25:
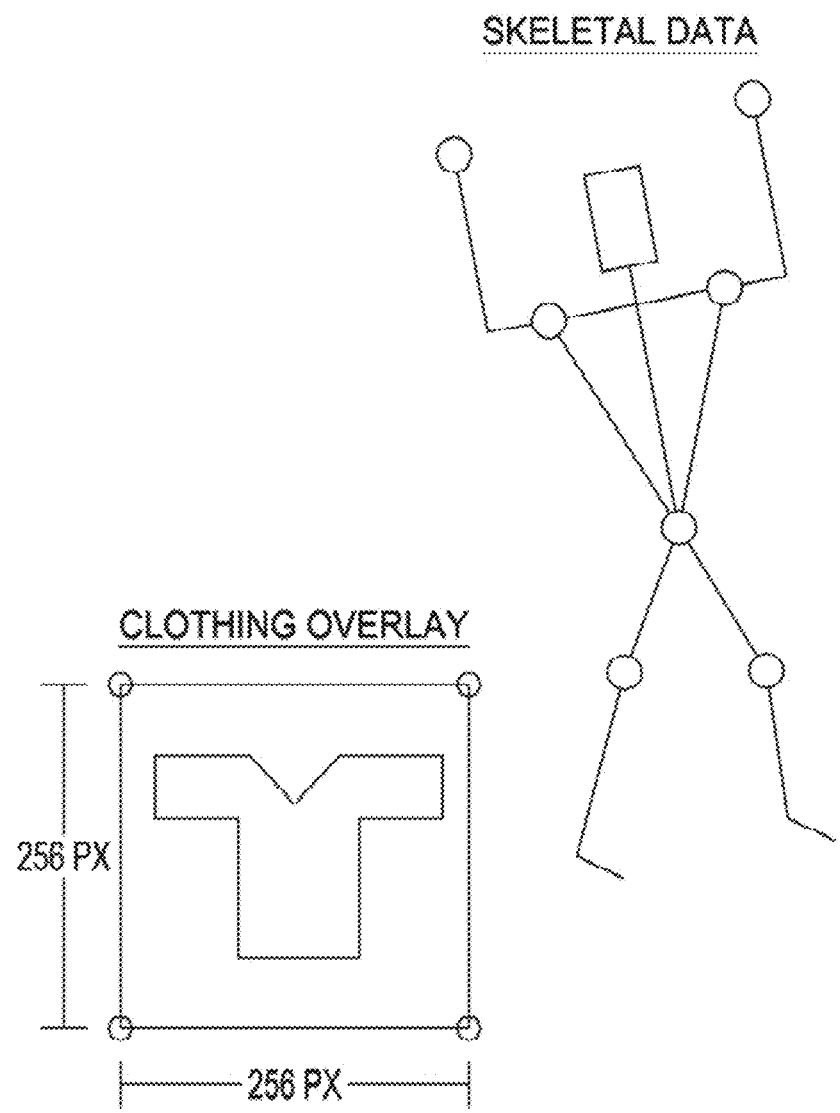
FIG. 25 is a conceptual diagram illustrating a gesture, according to some example embodiments.

FIG. 25 is a conceptual diagram illustrating a gesture, according to some example embodiments. In some example embodiments, a calibration pose (e.g., user has both arms up), as shown in FIG. 25, may be used to help the Kinect acquire spatial data that may include data about the body of the user and to begin tracking the body of the user. In other example embodiments, the depth sensor can acquire the spatial data about the user without the aid of the calibration pose (e.g., the user is in a sitting position). As described above with respect to FIG. 24, the system may receive spatial data about the environment external to the depth sensor at different points in time. Capturing spatial data about the user in the 3D space at different times may allow the system to track motions of the user (e.g., gestures made by the user). In some example embodiments, the limbs of the user may be represented as bones (e.g., symbolic bones in a skeleton or stick figure) in the models of the user's body. The user's body may also be represented in 3D models (e.g., 3D relief). In certain example embodiments, skeletal tracking of the differences (e.g., changes) between the models of the user generated based on spatial data captured at different times may allow the system to capture and interpret gestures made by the user.

For example, as shown in FIG. 25, the user, represented by a stick figure, has both arms up at the first time and one arm up and the other arm down at a second time. The system may generate a first model for when the user has both arms up (e.g., a first time) and a second model for when the user has one arm up and one arm down (e.g., a second time), based on spatial data received at a first and second times, respectively. By detecting and analyzing the difference between the first and second models, the system may determine that the difference (e.g., change) between the models corresponds to a gesture performed by the user between the first and second times. The system then may determine that the gesture represents a command to initiate an action within the electronic marketplace on behalf of the user. Examples of such an action are generating a representation (e.g., 2D or 3D) of an item to which the user is pointing, making a bid for an item listed for sale on the electronic marketplace, or creating a listing to sell an item of real clothing the user owns.

Furthermore, skeletal tracking of the models of the user's body may allow the system to track a midpoint of the user's body (e.g., in relation to the depth sensor) to properly represent an image of the user displayed on a screen. For example, as the user gets closer to the camera (e.g., the user moves from point one at a first time to point two at a second time), the user's body midpoint is closer to the camera and, thus, the skeleton representation generated when the user is closer to the camera becomes larger compared to the skeleton representation generated when the user was farther from the camera. As a result, the size of the representation of the user on the screen increases. In some example embodiments, skeletal tracking may be used to proportionally increase the texture size in the display of the virtual clothing items the user virtually tries on such that the virtual clothing texture is appropriately sized and properly tracks the user (e.g., when the user moves in the 3D space). Additional details about modeling of representations of items of clothing are described below with respect to FIG. 26.

Figure 26:
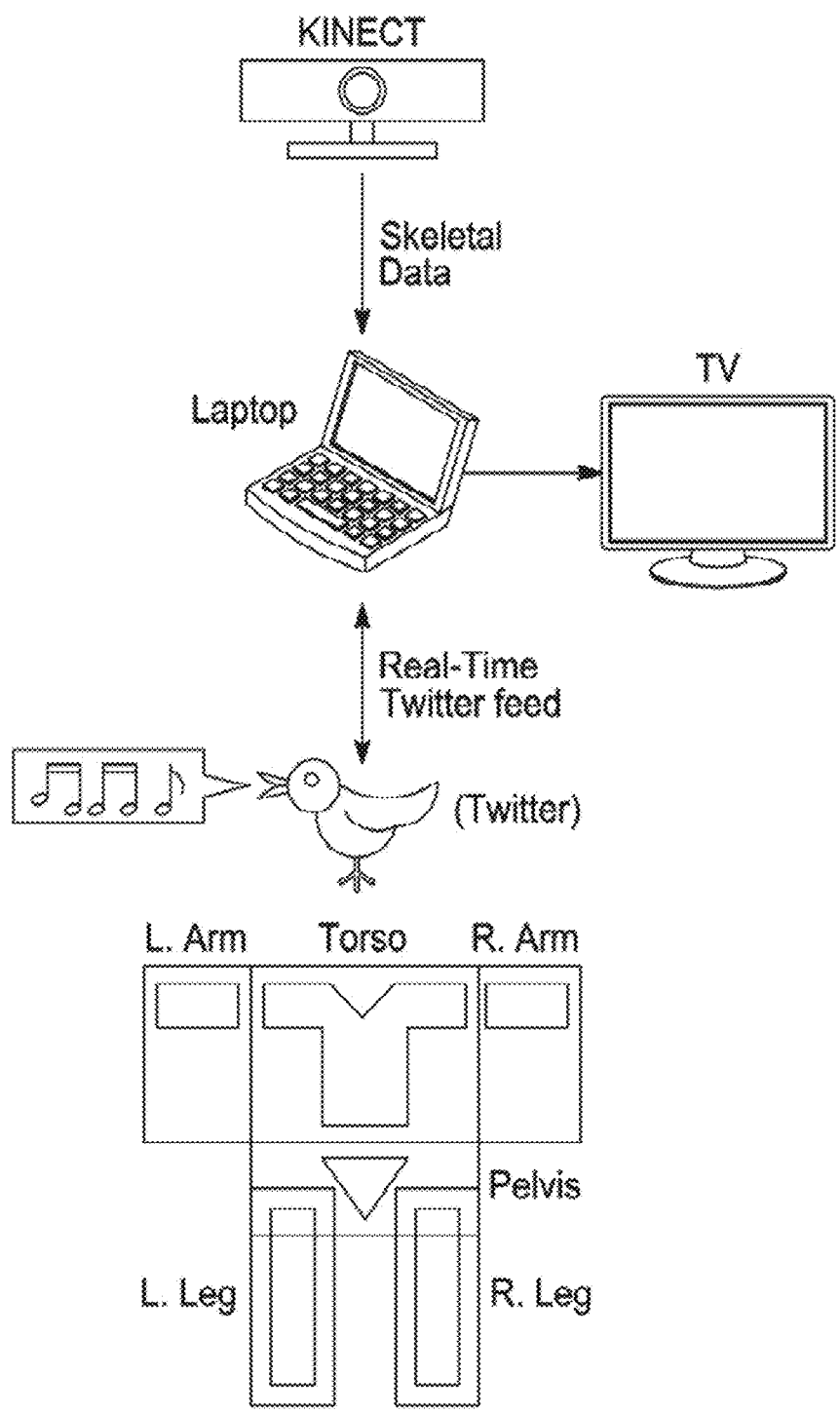
FIG. 26 is a conceptual diagram illustrating data flow in an example system and a model, according to some example embodiments.

FIG. 26 is a conceptual diagram illustrating data flow in an example system and a model, according to some example embodiments. In some example embodiments, the flow of spatial data may be symbolically represented as being received at the depth sensor (e.g., the Kinect). From the Kinect, the data may flow to the Laptop (e.g., symbolically representing a system described herein) where models of the user body may be generated based on the received spatial data. Based on these models, the system may determine whether the user made a gesture and, if so, determine what action is correlated to the gesture. Upon determining the action that is correlated to the gesture and that the action is to be initiated by the system, the system initiates the action on behalf of the user whose spatial data was received by the Kinect. An example of an action, as illustrated in FIG. 26, is facilitating a real-time Twitter feed to obtain fashion opinions from social network friends. Another example of an action is displaying a 3D representation of an item of clothing on a 3D avatar of the user on a screen.

Also shown in FIG. 26 is an example of an illustration of a model of a virtual outfit in relation to the body of the user. In some example embodiments, the virtual outfit is broken up (e.g., divided) into six different textures (e.g., areas or boxes, each box representing one .png texture with alpha, where "alpha" is the alpha channel of the image, which may allow some parts of the image to be transparent). Certain points of each texture may be locked to the skeleton representation such that each texture can scale and rotate independently from the other textures. If, for example, the user wearing the virtual outfit moves only the user's arm closer to the camera, the system scales only the respective arm texture without scaling the other textures (e.g., leaves the other textures alone). This may allow for a more realistic representation of user movement and of virtual clothing while displaying a representation of the user trying on virtual clothes in the virtual dressing room.

Figure 27:
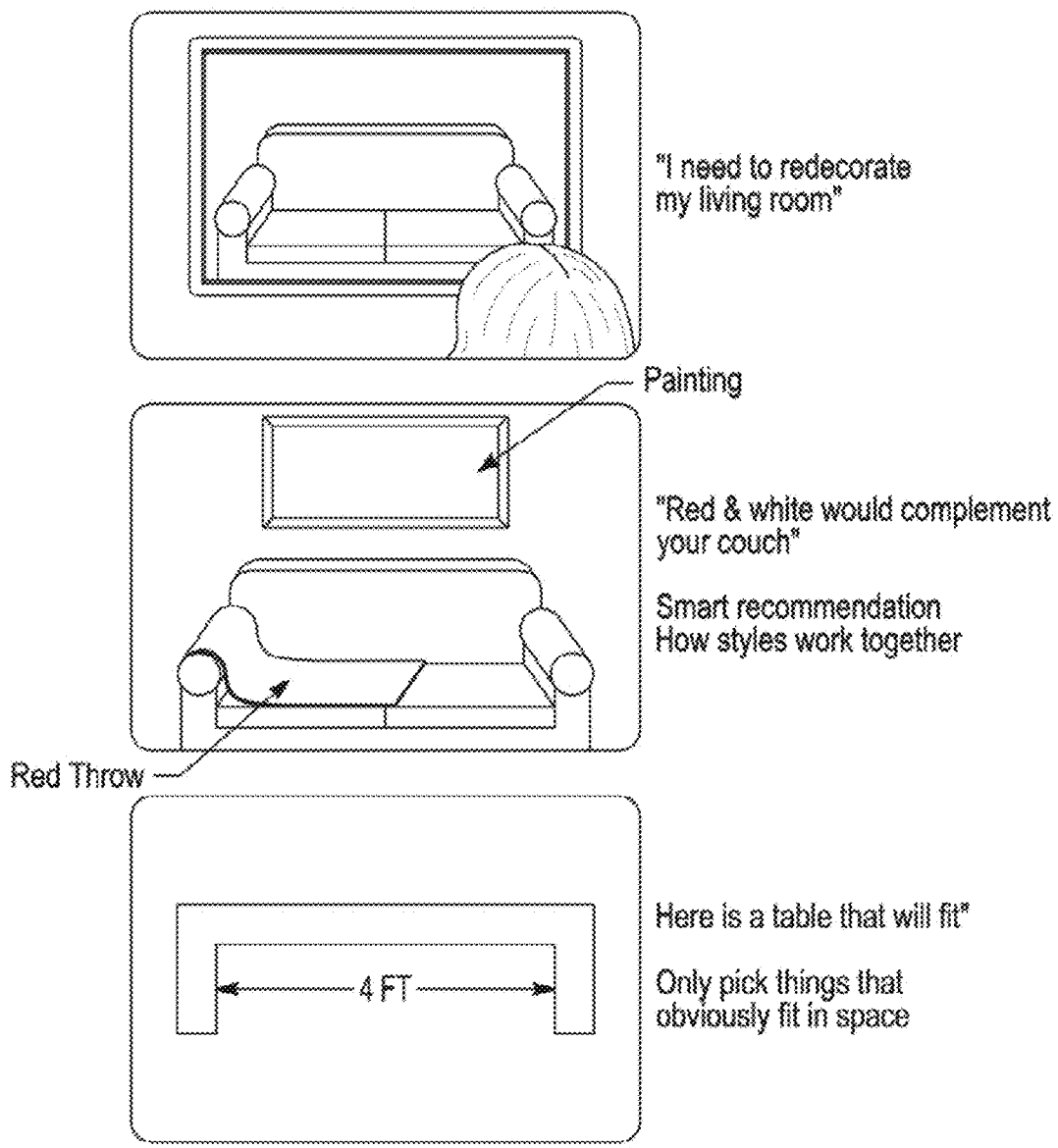
FIG. 27 is a conceptual diagram illustrating the use of the present method and system in the context of home and garden decorating and curated recommendations, according to some example embodiments.

FIG. 27 is a conceptual diagram illustrating the use of the present method and system in the context of home and garden decorating and of curated recommendations, according to some example embodiments. In some example embodiments, the present system including depth sensing technology may be used to decorate the user's room. For example, the user may request the recommendation of an interior decorator. The depth sensor in the user's room may capture spatial data about the room and, based on the captured spatial data, the system may create a 3D view of the room (e.g., a model of the room). Based on the 3D view of the room, a decorator may make recommendations to the user on how styles may work together (e.g., "Red and white would complement your couch" or "Here is a table that will fit"). In various example embodiments, the generated model of the room may assist the decorator to only recommend items that fit the size of the room or work with other furniture that may already be in the room.

Figure 28:
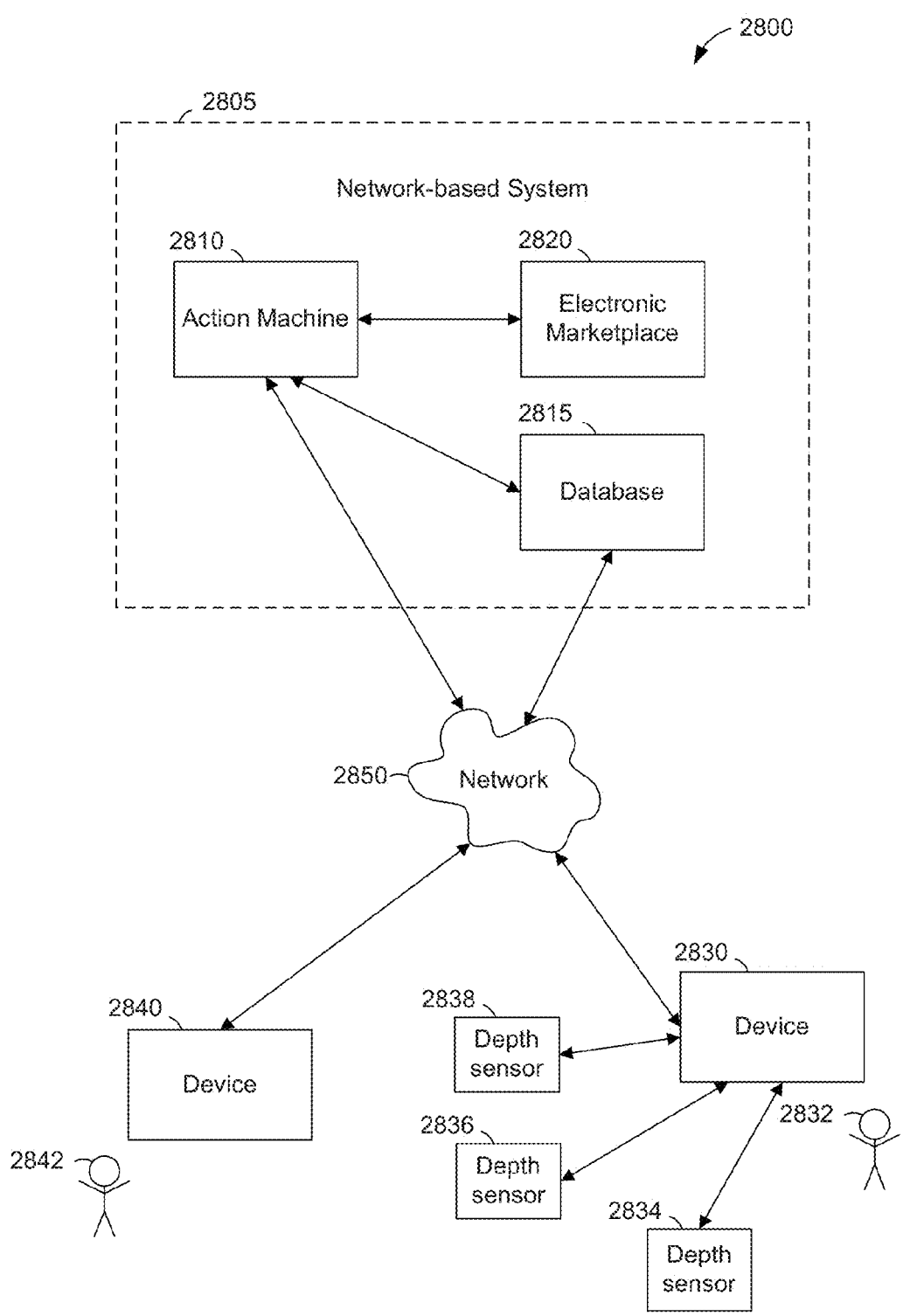
FIG. 28 is a network diagram illustrating a network environment suitable for action initiation on behalf of a user based on gesture recognition, according to some example embodiments.

FIG. 28 is a network diagram illustrating a network environment 2800 suitable for action determination and initiation on behalf of the user, within an electronic marketplace, based on gesture recognition, according to some example embodiments. The network environment 2800 includes an action machine 2810, a database 2815, an electronic marketplace 2820, and devices 2830 and 2840, all communicatively coupled to each other through a network 2850. In some example embodiments, the database 2815 may house an asset library to store 2D or 3D representations of users' bodies, users' body measurements, or both, as well as 2D or 3D representations of items (e.g., clothing or other objects). As shown in FIG. 28, the action machine 2810, the database 2815, the electronic marketplace 2820, some or all of them, may form all or part of a network-based system 2805. The action machine 2810, the database 2815, the electronic marketplace 2820, and the devices 2830 and 2840 may each be implemented in a computer system, in whole or in part, as described below with respect to FIG. 35.

Also shown in FIG. 28 are users 2832 and 2842. One or both of the users 2832 and 2842 may be a human user (e.g., a human being), a machine user (e.g., a computer configured by a software program to interact with the device 2830 or device 2840), or any suitable combination thereof (e.g., a human assisted by a machine or a machine supervised by a human). The user 2832 is not part of the network environment 2800, but is associated with the device 2830 and may be the user of the device 2830. For example, the device 2830 may be a desktop computer, a vehicle computer, a tablet computer, a navigational device, a portable media device, or a smart phone belonging to the user 2832. Likewise, the user 2842 is not part of the network environment 2800, but is associated with the device 2840. As an example, the device 2840 may be a desktop computer, a vehicle computer, a tablet computer, a navigational device, a portable media device, or a smart phone belonging to the user 2842.

Also shown in FIG. 28 are the depth sensors 2834, 2836, and 2838 (e.g., a Kinect; a mobile device, such as a cell phone, tablet, or PDA; or a camera; hereinafter, also "depth sensor(s)"). The system (e.g., the network environment 2800) may include one or more depth sensors. In some example embodiments, one or more of the depth sensor 2834, 2836, or 2838 may be part of the device 2830. In other example embodiments, the depth sensors 2834, 2836, or 2838 may be external to the device 2830. Each depth sensor 2834, 2836, and 2838 may capture (e.g., receive, gather, or collect) spatial data about the physical space external to the depth sensor (e.g., spatial data about user 2832) and transmit the captured spatial data to the device 2830, which in turn may transmit some or all of the spatial data captured by the depth sensor 2834, 2836, or 2838 to the action machine 2810 via network 2850. In some example embodiments, the depth sensor 2834, 2836, or 2838 may communicate with and send the captured spatial data to the action machine 2810 via network 2850 without first sending the spatial data to the device 2830.

Any of the machines, databases, or devices shown in FIG. 28 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 35. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 28 may be combined into a single machine, and the functions described herein for any single machine, database, or device may be subdivided among multiple machines, databases, or devices.

The network 2850 may be any network that enables communication between or among machines, databases, and devices (e.g., the action machine 2810 and the device 2830). Accordingly, the network 2850 may be a wired network, a wireless network (e.g., a mobile or cellular network), or any suitable combination thereof. The network 2850 may include one or more portions that constitute a private network, a public network (e.g., the Internet), or any suitable combination thereof.

Figure 29:
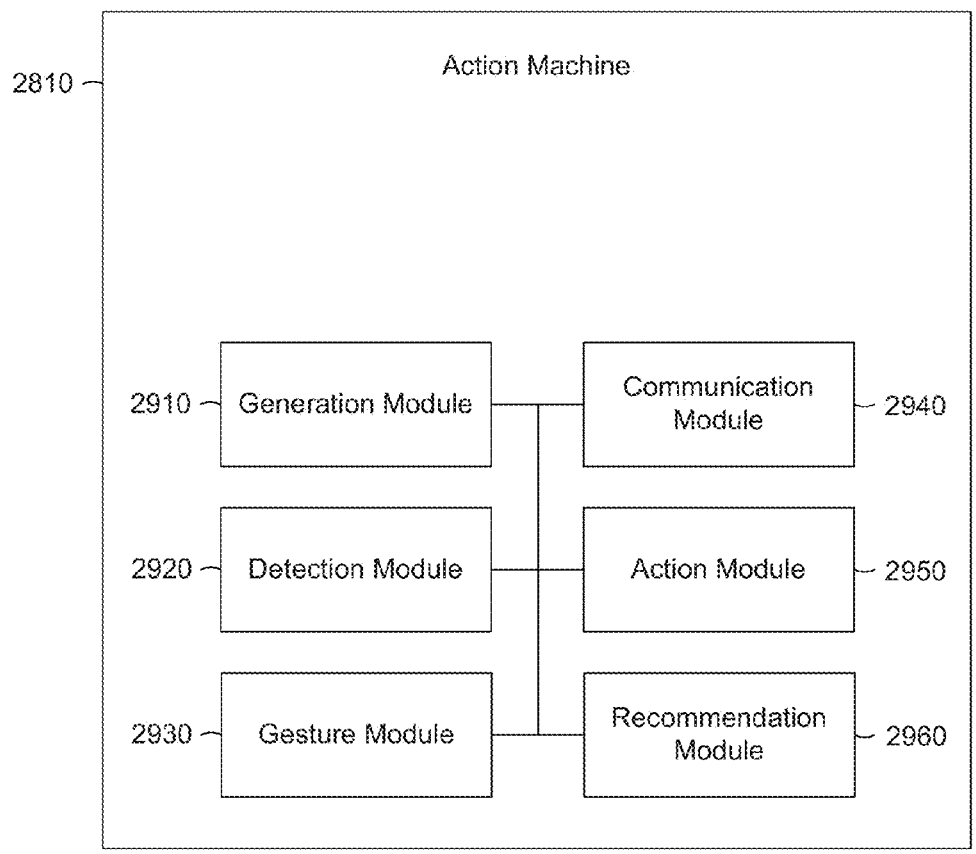
FIG. 29 is a block diagram illustrating components of an action machine suitable for action initiation on behalf of a user based on gesture recognition, according to some example embodiments.

FIG. 29 is a block diagram illustrating components of the action machine 2810, according to some example embodiments. The action machine 2810 is shown as including a generation module 2910, a detection module 2920, a gesture module 2930, a communication module 2940, an action module 2950, and a recommendation module 2960, all configured to communicate with each other (e.g., via a bus, shared memory, or a switch). The functions of these modules 2910-2960 are described below with respect to FIGS. 30-34.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 30:
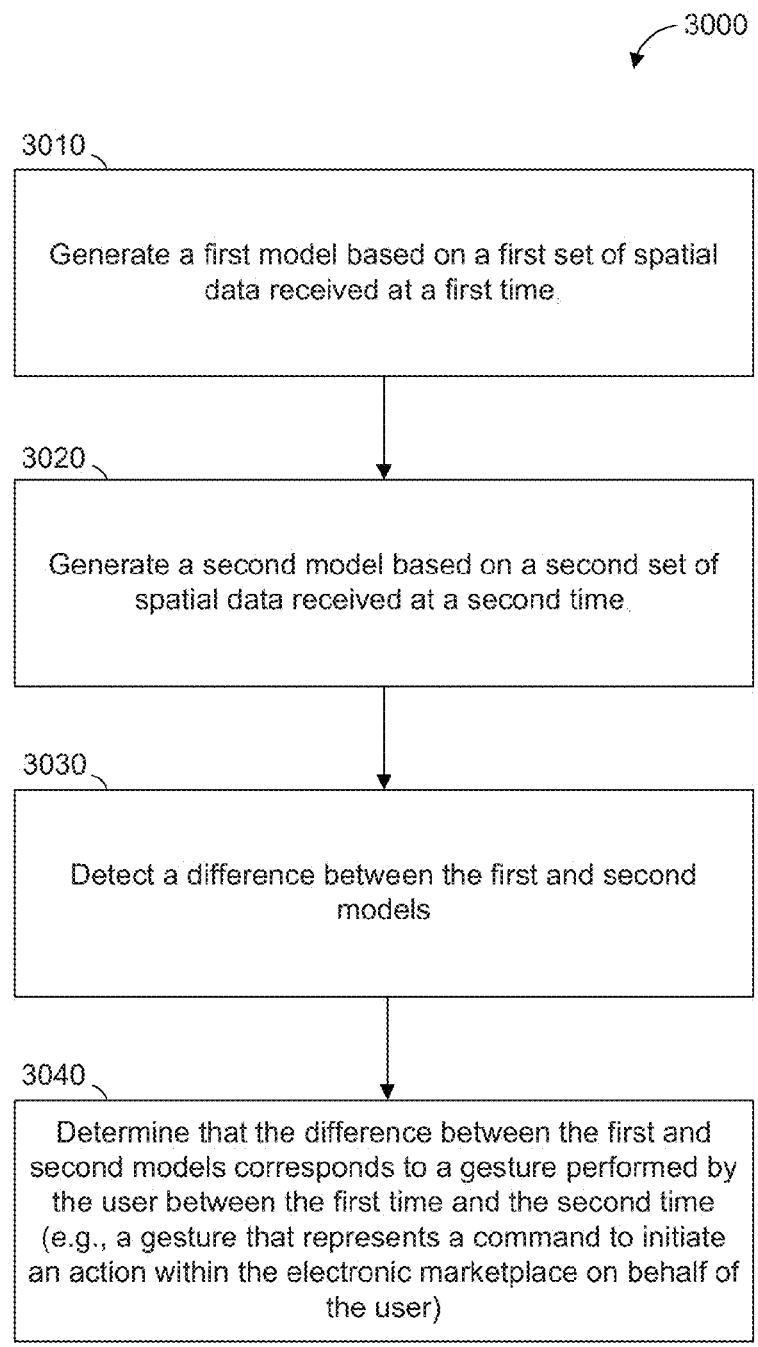
FIGS. 30-34 are flowcharts illustrating operations of the action machine in performing a method of action initiation on behalf of a user based on gesture recognition, according to some example embodiments.

FIGS. 30-34 are flowcharts illustrating operations of the action machine 2810 in performing a method 3000 of action determination and initiation on behalf of the user, within an electronic marketplace, based on gesture recognition, according to some example embodiments. Operations in the method 3000 may be performed by the action machine 2810 of FIGS. 28-29, using modules described above with respect to FIG. 29. As shown in FIG. 30, the method 3000 includes operations 3010, 3020, 3030, and 3040.

In operation 3010, the generation module 2910 generates a first model based on (e.g., from) a first set of spatial data received at a first time. For example, the first model may be representative of the user 2832 of the electronic marketplace 2820 who may be positioned in the field of view of the depth sensor 2834. In some example embodiments, the first model may be a 2D representation (e.g., a silhouette, outline, profile, contour, or a skeletal representation) of the body of the user 2832. In other example embodiments, the first model may be a 3D representation (e.g., a relief showing the form or shape of the body in 3D, including differences in elevation and slope between different areas) of the body of the user 2832. Further details of operation 3010 are discussed below with respect to FIG. 31.

In operation 3020, the generation module 2910 generates a second model based on a second set of spatial data received at a second time (e.g., 1.5 seconds after the first time). For example, the second model may be representative of the user 2832 of the electronic marketplace 2820 who may be positioned in the field of view of the depth sensor 2834. In some example embodiments, the second model may be a 2D representation of the body of the user 2832, as described above with respect to operation 3010. In other example embodiments, the second model may be a 3D representation of the body of the user 2832, as described above with respect to operation 3010. Further details of operation 3020 are discussed below with respect to FIG. 31.

In operation 3030, the detection module 2920 detects a difference between the first and second models generated in operations 3010 and 3020, respectively. Further details of operation 3030 are discussed below with respect to FIG. 31.

In operation 3040, the gesture module 2930 determines that the difference between the first and second models, detected in operation 3030, corresponds to a gesture performed by the user between the first time and second time (e.g., the user started the motion representing the gesture at or after the first time and finished the motion by the second time). As noted above, the gesture may represent a command to initiate an action within the electronic marketplace on behalf of the user. Further details of operation 3040 are discussed below with respect to FIG. 31.

Figure 31:
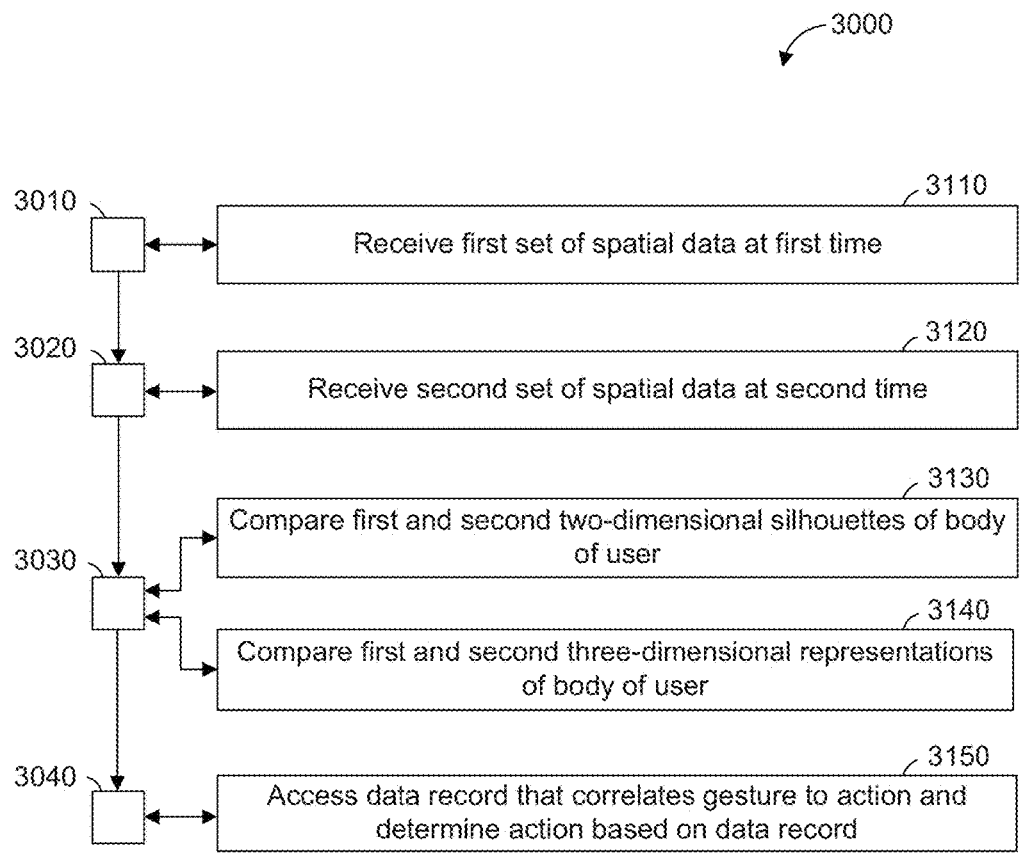

As shown in FIG. 31, the method 3000 may include one or more of operations 3110, 3120, 3130, 3140, and 3150. Operation 3110 may be performed as part (e.g., a precursor task, a subroutine, or a portion) of operation 3010, in which the generation module 2910 generates a first model based on a first set of data received at a first time.

In operation 3110, the generation module 2910 of the action machine 2810 receives a first set of spatial data from a depth sensor 2834 at a first time. Accordingly, the depth sensor 2834 may be configured to capture spatial data and to transmit the captured spatial data to the generation module 2910. In some example embodiments, the depth sensor 2834 may automatically send the captured spatial data to the generation module 2910. In other example embodiments, the depth sensor 2834 may respond to a request for spatial data, the request made by the action machine 2810.

Operation 3120 may be performed as part (e.g., a precursor task, a subroutine, or a portion) of operation 3020, in which the generation module 2910 generates a second model based on a second set of data received at a second time.

In operation 3120, the generation module 2910 of the action machine 2810 receives a second set of spatial data from a depth sensor 2834 at a second time. Accordingly, the depth sensor 2834 may be configured to capture spatial data and to transmit the captured spatial data to the generation module 2910. In some example embodiments, the depth sensor 2834 may automatically send the captured spatial data to the generation module 2910. In other example embodiments, the depth sensor 2834 may respond to a request for spatial data, where the request is made by the action machine 2810.

Operations 3130 and 3140 may be performed as part (e.g., a precursor task, a subroutine, or a portion) of operation 3030, in which the detection module 2920 detects a difference between the first and second models.

In some example embodiments, the first and second models of the body of the user are 2D representations (e.g., silhouettes) of the body of the user. In operation 3130, the detection module 2920 of the action machine 2810 compares a first 2D silhouette of the body of the user and a second 2D silhouette of the body of the user to discover the existence of a difference between the first and second models (e.g., silhouettes). The first 2D silhouette was generated by the generation module 2910 in operation 3010 based on the first set of data received at the first time in operation 3110. The second 2D silhouette was generated by the generation module 2910 in operation 3020 based on the second set of data received at the second time in operation 3120.

In other example embodiments, the first and second models of the body of the user are 3D representations (e.g., reliefs) of the body of the user. In operation 3140, the detection module 2920 of the action machine 2810 compares a first 3D representation of the body of the user and a second 3D representation of the body of the user to discover the existence of a difference between the first and second models (e.g., 3D representations or reliefs of the body of the user). The first 3D representation of the body of the user was generated by the generation module 2910 in operation 3010 based on the first set of data received at the first time in operation 3110. The second 3D representation of the body of the user was generated by the generation module 2910 in operation 3020 based on the second set of data received at the second time in operation 3120.

Operation 3150 may be performed as part (e.g., a precursor task, a subroutine, or a portion) of operation 3040, in which the gesture module 2930 determines that the difference between the first and second models corresponds to a gesture performed by the user between the first time and the second time. As noted above, the gesture represents a command to initiate an action within the electronic marketplace on behalf of the user.

In operation 3150, the gesture module 2930 accesses a data record. In some example embodiments, the data record is hosted in the database 2815 and accessed from the database 2815. The data record may correlate the gesture to an action to be initiated by the action module 2950, and the gesture module 2930 may determine the action based on the data record correlating the gesture to the action. In various example embodiments, a first gesture of the user may be correlated to a command to initiate a bid for an item listed for sale on the electronic marketplace 2820 without the user using a keyboard or mouse to interact with the user interface to place the bid. In certain example embodiments, a second gesture of the user indicating a physical object in the user's environment may be correlated to a command to create a 3D representation of the physical object. In some example embodiments, a third gesture of the user may be correlated to a command to include the 3D representation of the physical object in a listing describing the physical object being for sale on the electronic marketplace 2820.

Figure 32:
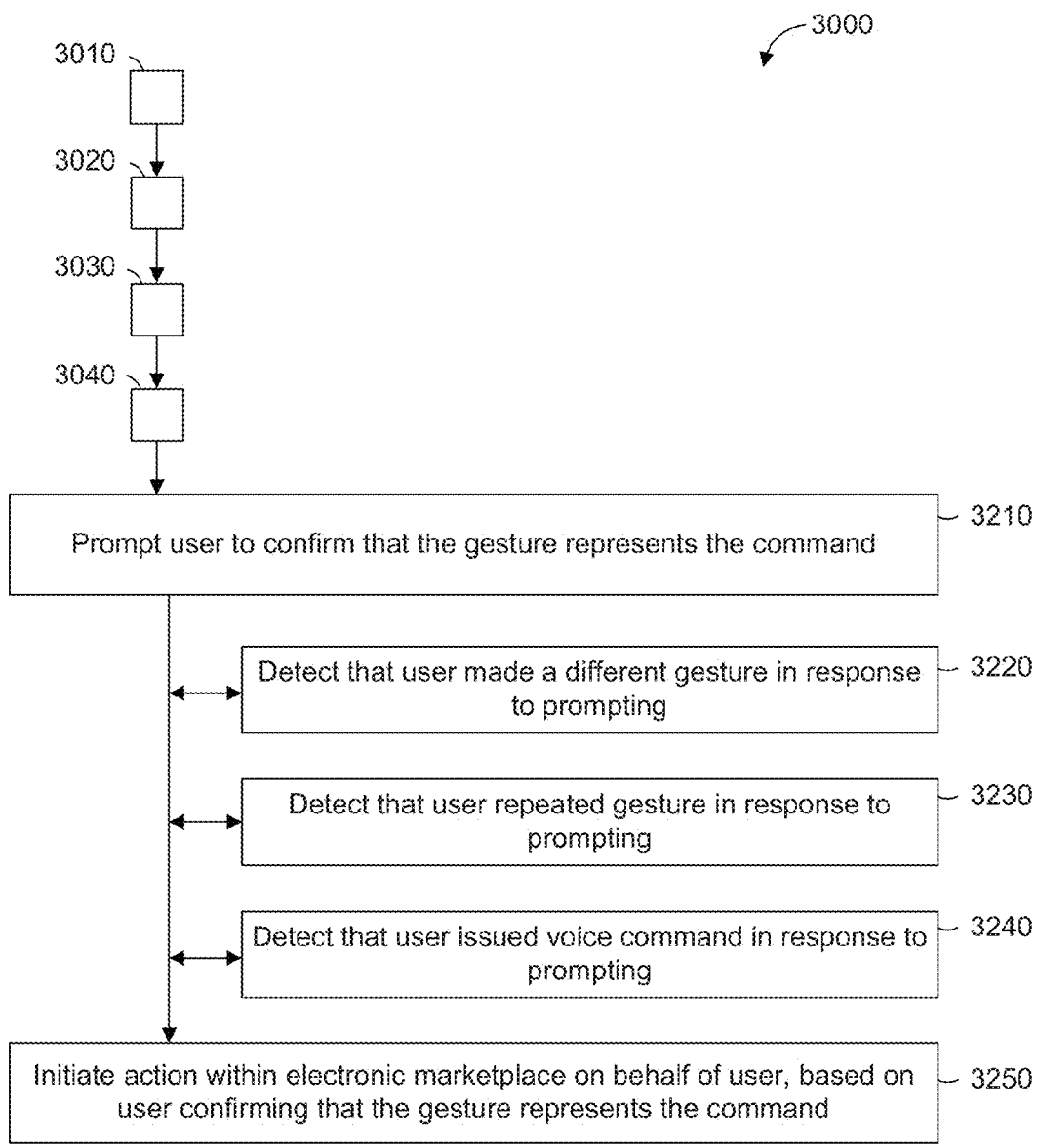

As shown in FIG. 32, the method 3000 may include one or more of operations 3210, 3220, 3230, 3240, and 3250. Operation 3210 may be performed as part (e.g., a subroutine or a portion) of operation 3040. In operation 3210, the communication module 2940 may prompt the user to confirm that the gesture represents a command to initiate the action determined in operation 3150. In some example embodiments, operation 3210 may be implemented to prevent an accidental gesture by the user from being interpreted as a command (e.g., to initiate a transaction on the electronic marketplace). A further action by the user may confirm or deny a particular interpretation of the gesture by the action machine 2810.

Operation 3220 may be performed as part (e.g., a subroutine or a portion) of, or subsequently to, operation 3210. In operation 3220, the gesture module 2930 may detect that the user made a different gesture (e.g., a confirmation gesture that indicates an affirmative response to the prompting performed in operation 3210) in response to the prompting by the communication module 2940. In some example embodiments, the generation module 2910 generates additional models of the body of the user based on further sets of spatial data collected after the prompting by the communication module 2940. These additional models may be compared in operation 3130 or operation 3140 to detect a difference that may correspond to a different gesture by the user. In some example embodiments, the different gesture indicates that the user has confirmed the gesture representing the command.

Operation 3230 may be performed as part (e.g., a subroutine or a portion) of, or subsequently to, operation 3210. In operation 3230, the gesture module 2930 may detect that the user repeated the gesture (e.g., made again the gesture representing the command) in response to the prompting by the communication module 2940. In some example embodiments, the repeating of the gesture representing the command indicates that the user has confirmed the gesture representing the command.

Operation 3240 may be performed as part (e.g., a subroutine or a portion) of, or subsequently to, operation 3210. In operation 3240, the gesture module 2930 may detect that the user issued a voice command (e.g., a vocalization that indicates an affirmative response to the prompting performed in operation 3210) in response to the prompting by the communication module 2940. In some example embodiments, a voice command by the user in response to the prompting indicates that the user has confirmed the gesture representing the command.

Operation 3250 may be performed as part (e.g., a subroutine or a portion) of, or subsequently to, operation 3210. In operation 3250, the action module 2950 initiates the action within the electronic marketplace 2820 on behalf of the user, based on the user confirming that the gesture represents the command. Further details of operation 3250 are discussed below with respect to FIGS. 33 and 34.

Figure 33:
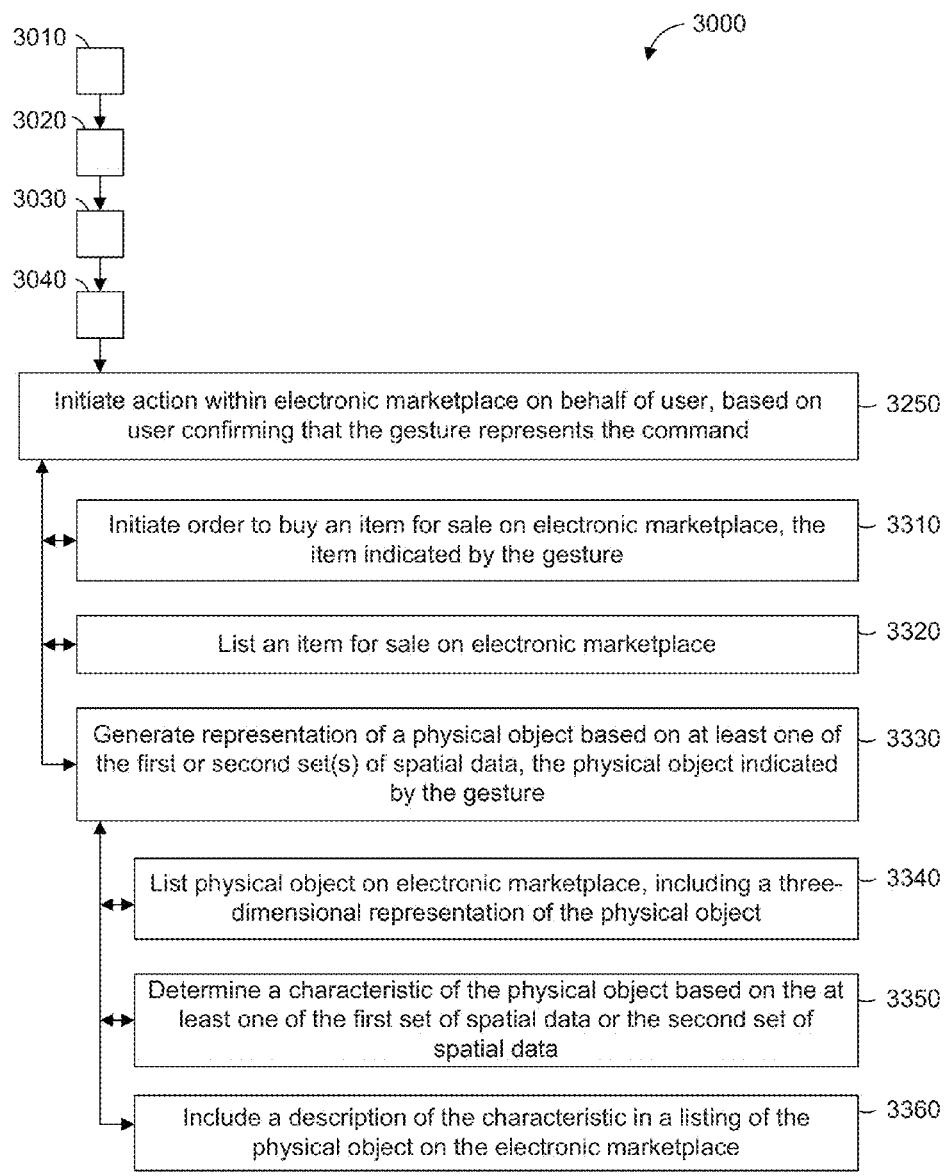

As shown in FIG. 33, the method 3000 may include one or more of operations 3310, 3320, 3330, 3340, 3350, and 3360. One or more of operations 3310, 3320, and 3330 may be performed as part of operation 3250, in which the action module 2950 initiates the action within the electronic marketplace 2820 on behalf of the user, which initiation of the action may be based on the user confirming that the gesture represents the command. In operation 3310, the action module 2950 initiates an order to buy an item for sale on the electronic marketplace 2820. In some example embodiments, the user's gesture indicates (e.g., is directed to) the item for sale displayed within a UI. In some example embodiments, the user identifies the item with a voice command.

In operation 3320, the action module 2950 lists an item for sale on the electronic marketplace 2820. In various example embodiments, the user's gesture indicates (e.g., it is directed to) the item (e.g., a physical object in the user's environment or an item displayed on a UI) to be listed for sale on the electronic marketplace 2820. In some example embodiments, the user identifies the item with a voice command. In various example embodiments, when the user indicates a physical object in the user's environment to be listed for sale on the electronic marketplace 2820, the action machine 2810 determines one or more characteristics (e.g., spatial measurements) of the physical object based on the spatial data captured by one or more of the depth sensors 2834, 2836, or 2838 and transmitted to the action machine 2810.

In operation 3330, the action module 2950 generates a representation of a physical object based on the first set of spatial data, the second set of spatial data, or both. The physical object may be indicated by the user's gesture. As noted above, the representation of the physical object may be two-dimensional or three-dimensional. In some example embodiments, the generated representation of the physical object is stored (e.g., as a data record) in the database 2815.

One or more of operations 3340, 3350, and 3360 may be performed as part of operation 3330, in which the action module 2950 generates the representation of the physical object indicated by the gesture of the user. In operation 3340, the action module 2950 lists the physical object (e.g., as being available for sale) on the electronic marketplace 2820. The resultant listing of the physical object may include a 3D representation of the physical object. In some example embodiments, the action module 2950 creates a listing for the physical object indicated by the user, retrieves a 3D representation of the physical object from a 3D asset library (e.g., the database 2815), and includes the 3D representation of the physical object in the listing. The listing may be published on the electronic marketplace 2820. In some example embodiments, the listing may be stored as part of a catalogue stored in the database 2815.

In operation 3350, the action module 2950 determines a characteristic of the physical object based on the first set of spatial data, the second set of spatial data, or both. An example of a characteristic includes the physical object's spatial dimensions.

In operation 3360, the action module 2950 includes a description of the characteristic in a listing of the physical object on the electronic marketplace 2820. In various example embodiments, the characteristic is a spatial dimension of the physical object, and the description of the characteristic may quantify the spatial dimension (e.g., describe the size of the physical object) in the listing.

Figure 34:
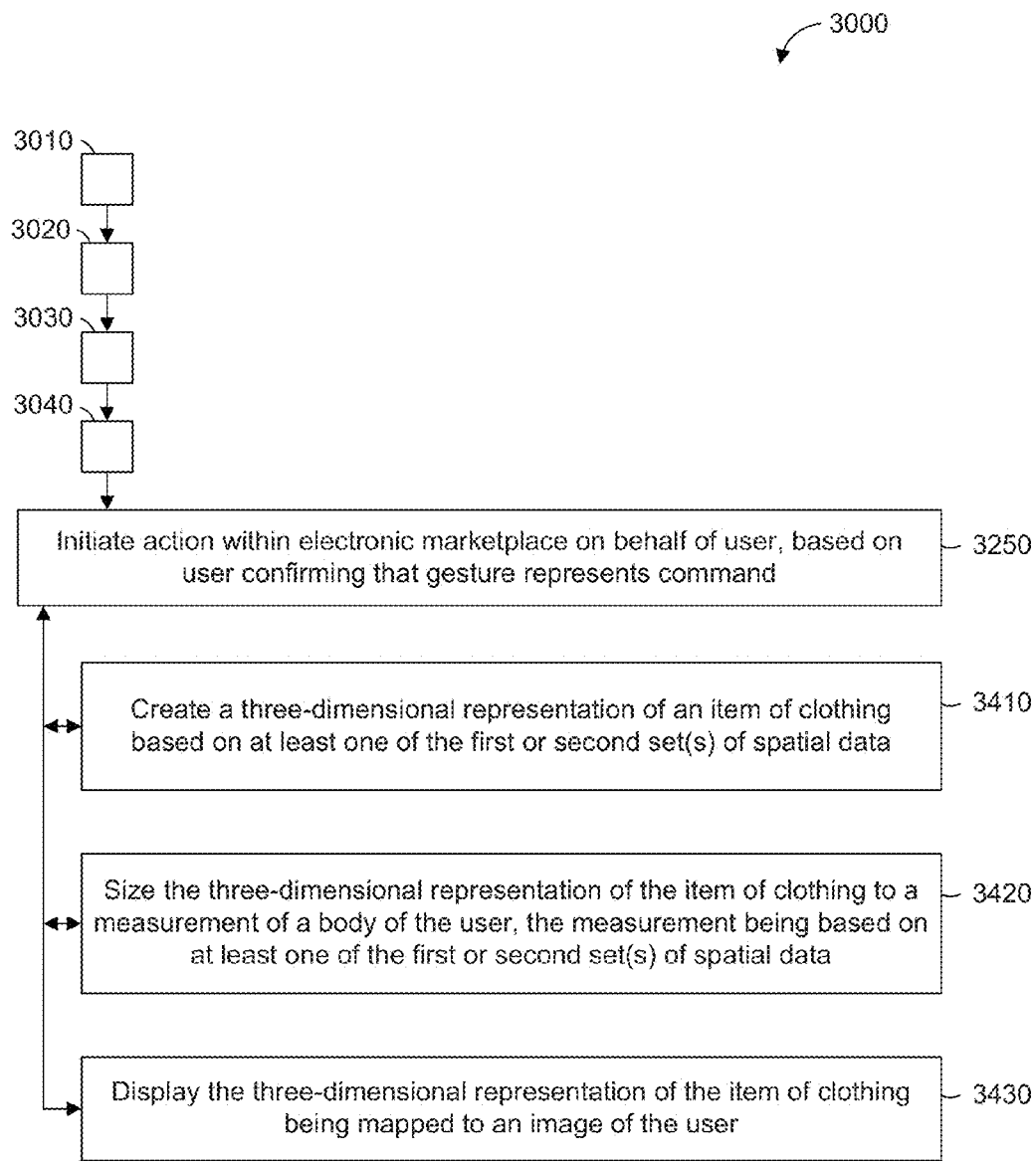

As shown in FIG. 34, the method 3000 may include one or more of operations 3410, 3420, and 3430. One or more of operations 3410, 3420, and 3430 may be performed as part of operation 3250, in which the action module 2950 initiates the action within the electronic marketplace 2820 on behalf of the user, which initiation of the action may be based on the user confirming that the gesture represents the command. In operation 3410, the action module 2950 creates a 3D representation of an item of clothing based on the first set of spatial data, the second set of spatial data, or both.

In operation 3420, the action module 2950 sizes (e.g., adjusts the size of) the 3D representation of the item of clothing according to a measurement of the user's body. The measurement may be based on the first set of spatial data, the second set of spatial data, or both.

In operation 3430, the action module 2950 displays the 3D representation of the item of clothing as being mapped to an image of the user. The 3D representation of the item of clothing may be mapped to the appropriate area of the body of the user, as depicted in the image of the user. For example, a 3D representation of a pair of trousers may be mapped to the legs of the user in the image of the user. In some example embodiments, the image of the user shows a 2D representation (e.g., a photograph or video feed) of the user. In other example embodiments, the image of the user shows a 3D representation (e.g., a 3D model or 3D avatar) of the user.

According to various example embodiments, one or more of the methodologies described herein may facilitate action determination based on gesture recognition from spatial data. Moreover, one or more of the methodologies described herein may facilitate action initiation in an electronic marketplace on behalf of the user based on the action determination. Hence, one or more of the methodologies described herein may facilitate generation of information using gesture recognition, the generated information being used during the initiation of actions on an electronic marketplace on behalf of the user.

When these effects are considered in aggregate, one or more of the methodologies described herein may obviate a need for certain efforts or resources that otherwise would be involved in action determination and initiation in an electronic marketplace based on gesture recognition. Computing resources used by one or more machines, databases, or devices (e.g., within the network environment 2800) may be reduced. Examples of such computing resources include processor cycles, network traffic, memory usage, data storage capacity, power consumption, and cooling capacity.

Figure 35:
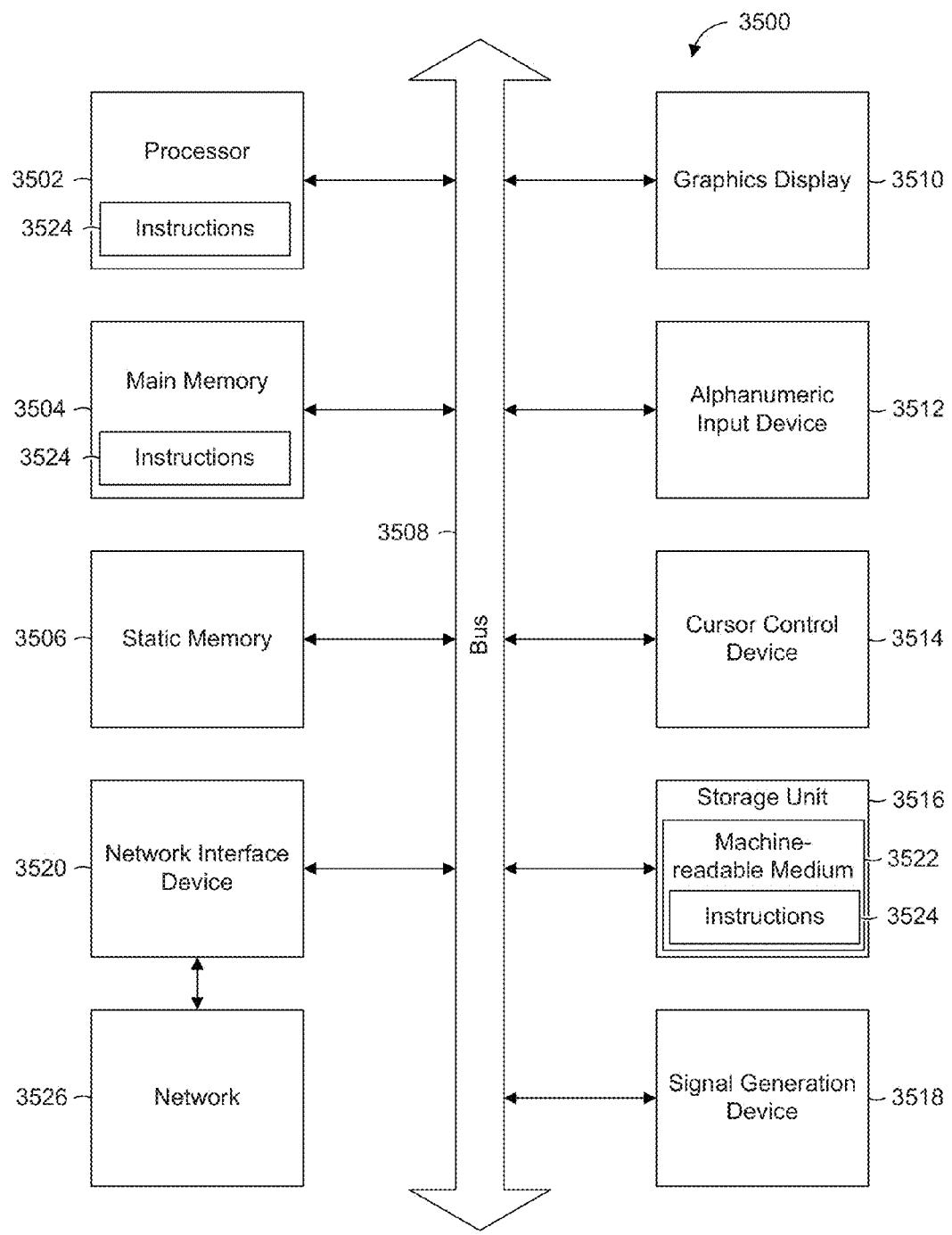
FIG. 35 is a block diagram illustrating components of a machine, according to some example embodiments, able to read instructions from a machine-readable medium and perform any one or more of the methodologies discussed herein.

FIG. 35 is a block diagram illustrating components of a machine 3500, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 35 shows a diagrammatic representation of the machine 3500 in the example form of a computer system and within which instructions 3524 (e.g., software, a program, an application, an applet, an app, or other executable code) for causing the machine 3500 to perform any one or more of the methodologies discussed herein may be executed, in whole or in part. In alternative embodiments, the machine 3500 operates as a standalone device or may be connected (e.g., networked) to other machines. In a networked deployment, the machine 3500 may operate in the capacity of a server machine or a client machine in a server-client network environment, or as a peer machine in a distributed (e.g., peer-to-peer) network environment. The machine 3500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 3524, sequentially or otherwise, that specify actions to be taken by that machine. Further, while only a single machine is illustrated, the term "machine" shall also be taken to include a collection of machines that individually or jointly execute the instructions 3524 to perform all or part of any one or more of the methodologies discussed herein.

The machine 3500 includes a processor 3502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 3504, and a static memory 3506, which are configured to communicate with each other via a bus 3508. The machine 3500 may further include a graphics display 3510 (e.g., a plasma display panel (PDP), a light emitting diode (LED) display, a liquid crystal display (LCD), a projector, or a cathode ray tube (CRT)). The machine 3500 may also include an alphanumeric input device 3512 (e.g., a keyboard), a cursor control device 3514 (e.g., a mouse, a touchpad, a trackball, a joystick, a motion sensor, or other pointing instrument), a storage unit 3516, a signal generation device 3518 (e.g., a speaker), and a network interface device 3520.

The storage unit 3516 includes a machine-readable medium 3522 on which is stored the instructions 3524 embodying any one or more of the methodologies or functions described herein. The instructions 3524 may also reside, completely or at least partially, within the main memory 3504, within the processor 3502 (e.g., within the processor's cache memory), or both, during execution thereof by the machine 3500. Accordingly, the main memory 3504 and the processor 3502 may be considered as machine-readable media. The instructions 3524 may be transmitted or received over a network 3526 (e.g., network 2850) via the network interface device 3520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 3522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 3500), such that the instructions, when executed by one or more processors of the machine (e.g., processor 3502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
one or more hardware processors and executable instructions accessible on a computer-readable medium that, when executed, cause the one or more hardware processors to perform operations comprising:
generating a first model based on a first set of spatial data received at a first time, the first model being representative of a user of an electronic marketplace;
generating a second model based on a second set of spatial data received at a second time, the second model being representative of the user;
detecting a difference between the first and second models;
determining that the difference between the first and second models corresponds to a gesture by the user, the gesture identifying a physical object other than a display screen in an environment of the user, the gesture representing a command to initiate an action with respect to the physical object identified by the gesture in the environment of the user, the action with respect to the physical object identified in the environment of the user including listing the physical object identified in the environment of the user for sale on the electronic marketplace on behalf of the user making the gesture; and
generating a listing for a sale of the physical object identified by the gesture in the environment of the user on the electronic marketplace, the generating of the listing being based on a determination that the command to initiate the action with respect to the physical object identified by the gesture in the environment of the user includes a command to list the physical object for sale on the electronic marketplace on behalf of the user making the gesture, the determination being performed based on a data record mapping the gesture by the user to the action including listing the physical object identified in the environment of the user for sale on the electronic marketplace on behalf of the user making the gesture.

2. The system of claim 1, wherein the operations further comprise:
prompting the user to confirm the gesture; and
initiating the action within the electronic marketplace on behalf of the user; the initiating being based on the user confirming the gesture.

3. A method comprising:
generating a first model based on a first set of spatial data received at a first time, the first model being representative of a user of an electronic marketplace;
generating a second model based on a second set of spatial data received at a second time, the second model being representative of the user;
detecting, using a hardware processor, a difference between the first and second models;
determining that the difference between the first and second models corresponds to a gesture by the user, the gesture identifying a physical object other than a display screen in an environment of the user the gesture representing a command to initiate an action with respect to the physical object identified by the gesture in the environment of the user, the action with respect to the physical object identified in the environment of the user including listing the physical object identified in the environment of the user for sale on the electronic marketplace on behalf of the user making the gesture; and
generating a listing for a sale of the physical object identified by the gesture in the environment of the user on the electronic marketplace, the generating of the listing being based on a determination that the command to initiate the action with respect to the physical object identified by the gesture in the environment of the user includes a command to list the physical object for sale on the electronic marketplace on behalf of the user making the gesture, the determination being performed based on a data record mapping the gesture by the user to the action including listing the physical object identified in the environment of the user for sale on the electronic marketplace on behalf of the user making the gesture.

4. The method of claim 3, wherein the first and second models are two-dimensional silhouettes of a body of the user.

5. The method of claim 3, wherein the first and second models are three-dimensional representations of a body of the user.

6. The method of claim 3; further comprising:
prompting the user to confirm that the gesture represents the command; and
initiating the action within the electronic marketplace on behalf of the user; the initiating being based on the user confirming that the gesture represents the command.

7. The method of claim 6, further comprising:
detecting that the user made a different gesture in response to the prompting.

8. The method of claim 7, wherein the detecting includes receiving a voice command by the user in response to the prompting.

9. The method of claim 6, further comprising:
detecting that the user repeated the gesture in response to the prompting.

10. The method of claim 9; wherein the detecting that the user repeated the gesture in response to the prompting includes receiving a voice command by be user in response to the prompting.

11. The method of claim 3, further comprising:
accessing the data record at a database based on determining that the difference between the first and second models corresponds to the gesture by the user.

12. The method of claim 3, wherein the action includes:
generating a representation of the physical object based on at least one of the first set of spatial data or the second set of spatial data.

13. The method of claim 3, wherein the listing includes a three-dimensional representation of the physical object.

14. The method of claim 3, further comprising:
determining a characteristic of the physical object based on the at least one of the first set of spatial data or the second set of spatial data; and
including a description of the characteristic in the listing for the sale of the physical object on the electronic marketplace.

15. The method of claim 14, wherein the characteristic is a spatial dimension of the physical object, and the description quantifies the spatial dimension.

16. The method of claim 3, wherein the physical object is an item of clothing, the method further comprising:
creating a three-dimensional representation of the item of clothing, the creating being based on at least one of the first set of spatial data or second set of spatial data;
sizing the three-dimensional representation of the item of clothing to a measurement of a body of the user, the measurement being based on at least one of the first set of spatial data or second set of spatial data; and
displaying the three-dimensional representation of the item of clothing being mapped to an image of the user.

17. The method of claim 3, wherein the gesture is a first gesture, the command is a first command, the action is a first action, and the physical object is a first item, the method further comprising: detecting a second gesture representing a second command to initiate a second action, the second gesture indiacting a second item available for sale on the elctronic marketplace, the second action including initiating an order to buy the second item.

18. A non-transitory machine readable medium comprising instructions that, when executed by one or more processors of a machine, cause the machine to perform operations comprising:
generating a first model based on a first set of spatial data received at a first time, the first model being representative of a user of an electronic marketplace;
generating a second model based on a second set of spatial data received at a second time, the second model being representative of the user;
detecting a difference between the first and second models; and
determining that the difference between the first and second models corresponds to a gesture by the user, the gesture identifying a physical object other than a display screen in an environment of the user, the gesture representing a command to initiate an action with respect to the physical object identified by the gesture in the environment of the user, the action with respect to the physical object identified in the environment of the user including listing the physical object identified in the environment of the user for sale on the electronic marketplace on behalf of the user making the gesture; and
generating a listing for a sale of the physical object identified by the gesture in the environment of the user on the electronic marketplace, the generating of the listing being based on a determination that the command to initiate the action with respect to the physical object identified by the gesture in the environment of the user includes a command to list the physical object for sale on the electronic marketplace on behalf of the user making the gesture, the determination being performed based on a data record mapping the gesture by the user to the action including listing the physical object identified in the environment of the user for sale on the electronic marketplace on behalf of the user making the gesture.

* * * * *

UNITED STATES PATENT AND TRADEMARK OFFICE
CERTIFICATE OF CORRECTION

PATENT NO. : 9,898,742 B2
APPLICATION NO. : 13/679498
DATED : February 20, 2018
INVENTOR(S) : Krystal Rose Higgins et al.

It is certified that error appears in the above-identified patent and that said Letters Patent is hereby corrected as shown below:

In the Claims

In Column 32, Line 9, in Claim 3, delete "user" and insert -- user, --, therefor.

In Column 32, Line 39, in Claim 6, delete "claim 3;" and insert -- claim 3, --, therefor.

In Column 32, Line 43, in Claim 6, delete "user;" and insert -- user, --, therefor.

In Column 32, Line 54, in Claim 10, delete "claim 9;" and insert -- claim 9, --, therefor.

In Column 32, Line 56, in Claim 10, delete "be" and insert -- the --, therefor.

In Column 33, Line 28, in Claim 17, delete "indiacting" and insert -- indicating --, therefor.

In Column 33, Line 29, in Claim 17, delete "elctronic" and insert -- electronic --, therefor.

Signed and Sealed this
Fifteenth Day of May, 2018

Andrei Iancu
*Director of the United States Patent and Trademark Office*